(12) United States Patent
Stierman et al.

(10) Patent No.: US 8,033,450 B2
(45) Date of Patent: Oct. 11, 2011

(54) EXPRESSION CODES FOR MICROPARTICLE MARKS BASED ON SIGNATURE STRINGS

(75) Inventors: Thomas Stierman, Mahtomedi, MN (US); Dan Hunt, Mounds View, MN (US); Chris Zdon, Minneapolis, MN (US); Peter Meyers, White Bear Lake, MN (US)

(73) Assignee: SMI Holdings, Inc., Arden Hills, MN (US)

( * ) Notice: Subject to any disclaimer, the term of this patent is extended or adjusted under 35 U.S.C. 154(b) by 1215 days.

(21) Appl. No.: 11/685,760

(22) Filed: Mar. 13, 2007

(65) Prior Publication Data

US 2010/0327050 A1   Dec. 30, 2010

Related U.S. Application Data

(60) Provisional application No. 60/781,955, filed on Mar. 13, 2006, provisional application No. 60/781,930, filed on Mar. 13, 2006, provisional application No. 60/781,626, filed on Mar. 13, 2006.

(51) Int. Cl.
*G06F 17/00* (2006.01)

(52) U.S. Cl. .......................... 235/375; 235/487; 235/493

(58) Field of Classification Search .................. 235/487, 235/491, 449, 450, 493, 375
See application file for complete search history.

(56) References Cited

U.S. PATENT DOCUMENTS

| | | |
|---|---|---|
| 1,787,995 A | 1/1931 | Reilly |
| 2,058,774 A | 10/1936 | Colligan |
| 2,088,412 A | 7/1937 | Grosvenor |
| 2,265,196 A | 12/1941 | Riley |
| 2,687,367 A | 8/1954 | Burrin |
| 2,885,366 A | 5/1959 | Her |
| 2,963,378 A | 12/1960 | Palmquist et al. |
| 3,013,958 A | 12/1961 | Fearon |
| 3,113,991 A | 12/1963 | Kleber |
| 3,128,744 A | 4/1964 | Jefferts et al. |
| 3,366,573 A | 1/1968 | Feuer |
| 3,451,778 A | 6/1969 | Fearon |
| 3,567,909 A | 3/1971 | Allen |
| 3,574,550 A | 4/1971 | Scott |
| 3,574,909 A | 4/1971 | Scott et al. |
| 3,628,271 A | 12/1971 | Carrell |

(Continued)

FOREIGN PATENT DOCUMENTS

CA      1056653      6/1979

(Continued)

OTHER PUBLICATIONS

Intrinsic Signature Identification System (ISIS), Verification Technologies, Inc., http://www.netventure.com/vti/isis/main.htm, Dec. 19, 1998, 3 pages.

(Continued)

*Primary Examiner* — Karl D. Frech
(74) *Attorney, Agent, or Firm* — Patterson Thuente Christensen Pedersen, P.A.

(57) ABSTRACT

A system, apparatus, and method for identifying and authenticating articles using expression codes obtained from marks incorporating microparticles on or in articles, article packaging, or article labeling where the expression codes are based on signature strings generated relative to attributes of valid individual microparticles. The system, apparatus, and method can also enable the serialization of articles over and above the code-formulation that is achievable with multi-layered color-coded microparticles or single expression microparticles.

41 Claims, 15 Drawing Sheets

U.S. PATENT DOCUMENTS

| | | |
|---|---|---|
| 3,632,993 A | 1/1972 | Acker |
| 3,663,685 A | 5/1972 | Evans |
| 3,663,801 A | 5/1972 | Wahli et al. |
| 3,700,305 A | 10/1972 | Bingham |
| 3,704,952 A | 12/1972 | Bird |
| 3,733,178 A | 5/1973 | Eriksen |
| 3,736,500 A | 5/1973 | Berkowitz et al. |
| 3,772,099 A | 11/1973 | Ryan et al. |
| 3,772,200 A | 11/1973 | Livesay |
| 3,788,814 A | 1/1974 | Goldblatt et al. |
| 3,835,297 A | 9/1974 | Inoue et al. |
| 3,835,782 A | 9/1974 | Griffith et al. |
| 3,861,886 A | 1/1975 | Meloy |
| 3,897,284 A | 7/1975 | Livesay |
| 3,950,891 A | 4/1976 | Hinkes |
| 3,958,041 A | 5/1976 | Wagner et al. |
| 3,964,294 A | 6/1976 | Shair et al. |
| 3,967,990 A | 7/1976 | Ryan et al. |
| 3,985,602 A | 10/1976 | Stuart |
| 4,013,490 A | 3/1977 | Ryan et al. |
| 4,018,635 A | 4/1977 | Ryan et al. |
| 4,023,040 A | 5/1977 | Weber |
| 4,029,506 A | 6/1977 | Dessauer |
| RE29,334 E | 8/1977 | Ryan |
| 4,053,433 A | 10/1977 | Lee |
| 4,097,279 A | 6/1978 | Whitehead |
| 4,131,064 A | 12/1978 | Ryan et al. |
| 4,197,104 A | 4/1980 | Krystyniak et al. |
| 4,198,307 A | 4/1980 | Berkowitz et al. |
| 4,223,004 A | 9/1980 | Hsia et al. |
| 4,238,524 A | 12/1980 | LaLiberte et al. |
| 4,243,734 A | 1/1981 | Dillon |
| 4,251,726 A | 2/1981 | Alvarez |
| 4,321,056 A | 3/1982 | Dimitroff |
| 4,329,393 A | 5/1982 | LaPerre et al. |
| 4,359,353 A | 11/1982 | Kydd |
| 4,359,399 A | 11/1982 | Boyars |
| 4,390,452 A | 6/1983 | Stevens |
| 4,397,142 A | 8/1983 | Bingham |
| 4,399,226 A | 8/1983 | Danielson et al. |
| 4,431,766 A | 2/1984 | Christie et al. |
| 4,441,943 A | 4/1984 | Kydd |
| 4,469,623 A | 9/1984 | Danielson et al. |
| 4,520,109 A | 5/1985 | Simmonds et al. |
| 4,606,927 A | 8/1986 | Jones |
| 4,640,035 A | 2/1987 | Kind et al. |
| 4,652,395 A | 3/1987 | Marcina et al. |
| 4,654,165 A | 3/1987 | Eisenberg |
| 4,690,689 A | 9/1987 | Malcosky et al. |
| 4,715,988 A | 12/1987 | Colin |
| 4,731,531 A | 3/1988 | Handke |
| 4,744,919 A | 5/1988 | O'Holleran |
| 4,764,474 A | 8/1988 | Orelup |
| 4,771,005 A | 9/1988 | Spiro |
| 4,785,290 A | 11/1988 | Goldman |
| 4,812,171 A | 3/1989 | Brettle |
| 4,812,412 A | 3/1989 | Truner |
| 4,824,144 A | 4/1989 | Tasma |
| 4,862,143 A | 8/1989 | Hirshfield et al. |
| 4,939,372 A | 7/1990 | Schvoerer et al. |
| 5,023,923 A | 6/1991 | Sanner et al. |
| 5,035,920 A | 7/1991 | Smrt et al. |
| 5,057,268 A | 10/1991 | Muller |
| 5,111,882 A | 5/1992 | Tang et al. |
| 5,118,369 A | 6/1992 | Shamir |
| 5,129,974 A | 7/1992 | Aurenius |
| 5,169,558 A | 12/1992 | Smrt et al. |
| 5,179,027 A | 1/1993 | Fisher |
| 5,217,708 A | 6/1993 | Pinkney |
| 5,246,861 A | 9/1993 | Miller et al. |
| 5,256,572 A | 10/1993 | Tang et al. |
| 5,267,756 A | 12/1993 | Molee et al. |
| 5,268,899 A | 12/1993 | Brown |
| 5,272,216 A | 12/1993 | Clark, Jr. et al. |
| 5,294,476 A | 3/1994 | Calhoun |
| 5,310,222 A | 5/1994 | Chatwin et al. |
| 5,380,047 A | 1/1995 | Molee et al. |
| 5,391,595 A | 2/1995 | Clark, Jr. et al. |
| 5,411,799 A | 5/1995 | Loving |
| 5,426,289 A | 6/1995 | Kinoshita et al. |
| 5,435,249 A | 7/1995 | Brent |
| 5,450,190 A | 9/1995 | Schwartz et al. |
| 5,454,324 A | 10/1995 | Larmignat |
| 5,474,937 A | 12/1995 | Anderson, II et al. |
| 5,521,984 A | 5/1996 | Denenberg et al. |
| 5,568,555 A | 10/1996 | Shamir |
| 5,619,025 A | 4/1997 | Hickman et al. |
| 5,637,169 A | 6/1997 | Hull et al. |
| 5,659,631 A | 8/1997 | Gormish et al. |
| 5,673,338 A | 9/1997 | Denenberg et al. |
| 5,677,187 A | 10/1997 | Anderson, II et al. |
| 5,760,394 A | 6/1998 | Welle |
| 5,763,176 A | 6/1998 | Slater et al. |
| 5,789,183 A | 8/1998 | Lee et al. |
| 5,798,147 A | 8/1998 | Beck |
| 5,818,032 A | 10/1998 | Sun et al. |
| 5,830,542 A | 11/1998 | Shigeno |
| 5,837,042 A | 11/1998 | Lent |
| 5,869,828 A | 2/1999 | Braginsky |
| 5,873,604 A | 2/1999 | Phillips |
| 5,888,444 A | 3/1999 | Dannenhauer et al. |
| 5,962,082 A | 10/1999 | Hendrickson et al. |
| 5,974,150 A | 10/1999 | Kaish et al. |
| 5,974,974 A | 11/1999 | Agnew |
| 6,019,287 A | 2/2000 | Mann |
| 6,025,200 A | 2/2000 | Kaish et al. |
| 6,030,000 A | 2/2000 | Diamond |
| 6,108,612 A | 8/2000 | Vescovi et al. |
| 6,147,149 A | 11/2000 | Anderson et al. |
| 6,165,609 A | 12/2000 | Curatolo |
| 6,200,628 B1 | 3/2001 | Rozumek et al. |
| 6,203,736 B1 | 3/2001 | Gailberger et al. |
| 6,232,124 B1 | 5/2001 | Selinfreund |
| 6,309,690 B1 | 10/2001 | Brogger et al. |
| 6,406,725 B1 | 6/2002 | Taylor |
| 6,432,715 B1 | 8/2002 | Nelson et al. |
| 6,455,157 B1 | 9/2002 | Simons |
| 6,458,595 B1 | 10/2002 | Selinfreund |
| 6,477,227 B1 | 11/2002 | Kaiser et al. |
| 6,490,030 B1 | 12/2002 | Gill et al. |
| 6,501,825 B2 | 12/2002 | Kaiser et al. |
| 6,512,580 B1 | 1/2003 | Behringer et al. |
| 6,524,859 B1 | 2/2003 | Heese |
| 6,525,111 B1 | 2/2003 | Spencer et al. |
| 6,572,784 B1 | 6/2003 | Coombs et al. |
| 6,589,626 B2 | 7/2003 | Selinfreund et al. |
| 6,609,728 B1 | 8/2003 | Voerman et al. |
| 6,611,612 B2 | 8/2003 | Mann |
| 6,620,360 B1 | 9/2003 | Simons |
| 6,630,960 B2 | 10/2003 | Takahashi et al. |
| 6,638,593 B2 | 10/2003 | Selinfreund et al. |
| 6,647,649 B2 | 11/2003 | Hunt et al. |
| 6,659,507 B2 | 12/2003 | Banahan |
| 6,691,916 B2 | 2/2004 | Noyes |
| 6,692,031 B2 | 2/2004 | McGraw |
| 6,701,304 B2 | 3/2004 | Leon |
| 6,707,539 B2 | 3/2004 | Selinfreund et al. |
| 6,708,618 B1 | 3/2004 | Tsai |
| 6,721,440 B2 | 4/2004 | Reed et al. |
| 6,735,324 B1 | 5/2004 | McKinley et al. |
| 6,850,592 B2 | 2/2005 | Schramm et al. |
| 6,899,827 B2 | 5/2005 | Lauf et al. |
| 6,908,737 B2 | 6/2005 | Ravkin et al. |
| 6,909,770 B2 | 6/2005 | Schramm et al. |
| 6,948,068 B2 | 9/2005 | Lawandy et al. |
| 6,989,525 B2 | 1/2006 | Howard |
| 7,038,766 B2 | 5/2006 | Kerns et al. |
| 7,039,214 B2 | 5/2006 | Miller et al. |
| 7,046,828 B1 | 5/2006 | Gibbs |
| 7,055,691 B2 | 6/2006 | Safian |
| 7,288,320 B2 | 10/2007 | Steenblik et al. |
| 7,389,420 B2 | 6/2008 | Tian |
| 2001/0041214 A1 | 11/2001 | Brogger et al. |
| 2001/0049101 A1 | 12/2001 | Brogger et al. |
| 2002/0009208 A1 | 1/2002 | Alattar et al. |
| 2002/0023218 A1 | 2/2002 | Lawandy et al. |
| 2003/0032033 A1 | 2/2003 | Anglin et al. |

| | | | |
|---|---|---|---|
| 2003/0036201 A1 | 2/2003 | Nelson et al. | |
| 2003/0058990 A1 | 3/2003 | Kaiser et al. | |
| 2003/0194052 A1 | 10/2003 | Price | |
| 2003/0194053 A1 | 10/2003 | Schramm | |
| 2003/0211288 A1 | 11/2003 | Schottland | |
| 2004/0004829 A1 | 1/2004 | Policappelli | |
| 2004/0029295 A1 | 2/2004 | Brogger et al. | |
| 2004/0098891 A1 | 5/2004 | Hunt et al. | |
| 2005/0031838 A1 | 2/2005 | Lagunowich et al. | |
| 2005/0094848 A1 | 5/2005 | Carr et al. | |
| 2005/0135656 A1 | 6/2005 | Alattar et al. | |
| 2005/0150964 A1 | 7/2005 | Lo | |
| 2005/0181511 A1 | 8/2005 | Mun et al. | |
| 2005/0230962 A1 | 10/2005 | Berson | |
| 2005/0239207 A1 | 10/2005 | Gelbart | |
| 2005/0255599 A1 | 11/2005 | Wang et al. | |
| 2005/0264001 A1 | 12/2005 | Kerns et al. | |
| 2005/0276906 A1 | 12/2005 | Metzger | |
| 2005/0289061 A1 | 12/2005 | Kulakowski et al. | |
| 2006/0014045 A1 | 1/2006 | Einhorn et al. | |
| 2006/0037222 A1 | 2/2006 | Hunt et al. | |
| 2006/0091670 A1 | 5/2006 | Gaynor | |
| 2006/0244253 A1 | 11/2006 | Wei | |
| 2007/0063051 A1 | 3/2007 | László et al. | |
| 2007/0254138 A1 | 11/2007 | Remmer | |
| 2008/0034426 A1 | 2/2008 | Stierman et al. | |
| 2009/0206162 A1* | 8/2009 | De Cremer et al. | 235/491 |

FOREIGN PATENT DOCUMENTS

| | | |
|---|---|---|
| CA | 2223163 | 10/1997 |
| DE | 1961474 | 7/1970 |
| DE | 2651528 | 5/1977 |
| DE | 2607014 | 3/1985 |
| EP | 0787656 | 5/2006 |
| FR | 2330537 | 7/1981 |
| GB | 1568699 | 6/1980 |
| GB | 2178481 | 2/1987 |
| GB | 2286044 | 8/1995 |
| GB | 2319337 | 5/1998 |
| JP | 52068278 | 6/1977 |
| NL | 9301405 | 3/1995 |
| WO | WO 99/45514 | 9/1999 |
| WO | WO 00/34937 | 6/2000 |
| WO | WO01/37207 | 5/2001 |
| WO | WO03/098188 | 11/2003 |
| WO | WO 03/048726 A3 | 12/2003 |
| WO | WO2004/089640 | 10/2004 |
| WO | WO 2005/014928 | 2/2005 |
| WO | WO 2005/040001 | 5/2005 |
| WO | WO 2005/085087 | 9/2005 |
| WO | WO2005/104008 A1 | 11/2005 |
| WO | WO 2005/119612 | 12/2005 |
| WO | WO 2005/123408 | 12/2005 |
| WO | WO 2007/106512 A2 | 9/2007 |
| WO | WO 2007/106514 A2 | 9/2007 |
| WO | WO 2007/106515 A2 | 9/2007 |

OTHER PUBLICATIONS

High Quality Sports Memorabilia, Tracercode®, Total Sports Concept, http://www.totalsportsconcepts.com/Authenticity.html, Mar. 15, 1999, 2 pages.

Kaplan, "Maximizing the Benefits of Brand Security—New Developments for Smart Production," PPMS Magazine, Spring 2003 Issue, 3 pages.

Pappu, "Physical One-Way Functions," Science, Sep. 20, 2002, vol. 297, 9 pages.

PCT International Search Report, PCT/US02/38329, 1 page.

PCT International Search Report, PCT/US07/06378, 3 pages.

PCT International Search Report, PCT/US07/06387, 2 pages.

Fisher, "Copycat Killer", NewScientist, Apr. 20, 2007. www.newscientist.com, pp. 1-6.

"Tagging makes RFID labels secure, says Creo." http://www.in-pharmatechnologist.com/Packaging/Tagging-makes-RFID-labels-secure-says-Creo. May 20, 2005. pp. 1.

"Kodak Traceless System for Pharmaceutical Anticounterfeiting ". pp. 1, http://graphicsl.kodak.com/jp/product/security_authentication/traceless_pharmaceutical/default.htm. Date unknown.

Creo and Acucote, What They Think? Creo and Acucote Announce New Security Label Printing Stocks. pp. 1-2. May 26, 2005.

Harrell, "If You want to Stop Counterfeiting or Track & Trace: Hi-Value Developed Brands-Pharmaceuticals & Cosmetics-Consumer Products," date unknown, pp. 1-78.

Kodak Stop Counterfeiting Protect Your high-Liability Pharmaceuticals, date unknown, pp. 1-28.

PCT International Preliminary Report on Patentability, PCT/US2007/006388 filed Mar. 13, 2007, 8 pages.

US 6,780,301, 08/2004, Natan (withdrawn)

* cited by examiner

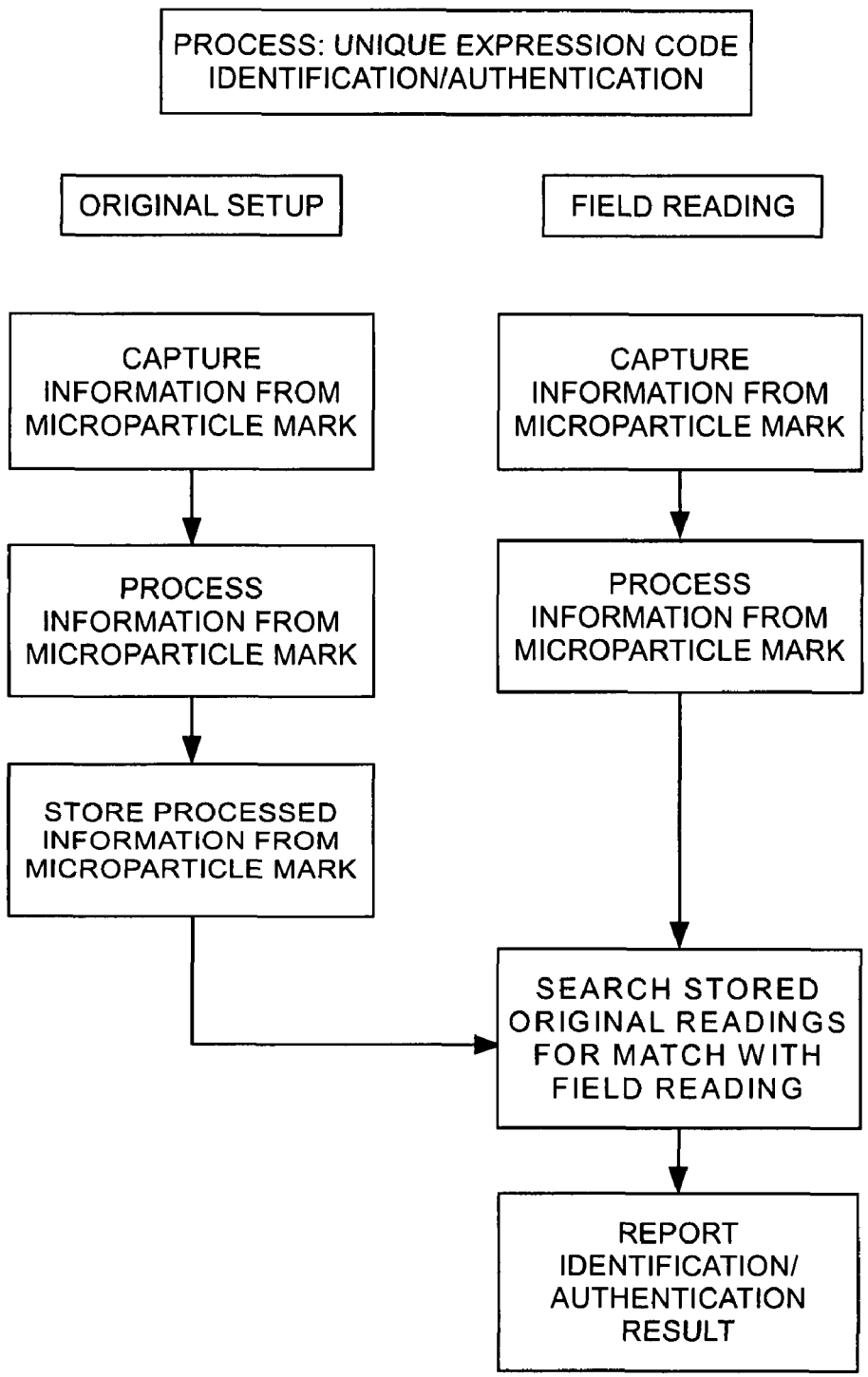

UNIQUE EXPRESSION CODE READING WITH GEOMETRIC FILTER KEY

EXPRESSION CODES FOR MICROPARTICLE MARKS BASED ON SIGNATURE STRINGS

PRIORITY CLAIM

The present application claims the benefit of U.S. Provisional Application No. 60/781,626, filed Mar. 13, 2006, entitled "Three-Dimensional Authentication of Microparticle Mark," U.S. Provisional Application No. 60/781,955, filed Mar. 13, 2006, entitled "Unique Codes for Microparticle Marks Based on Signature Strings," and U.S. Provisional Application No. 60/781,930, filed Mar. 13, 2006, entitled "Automatic Microparticle Mark Reader," which are incorporated herein in their entirety by reference.

FIELD OF THE INVENTION

The present invention generally relates to articles having concealed or covert, yet revealable, information using marks incorporating a multiplicity of microparticles applied on or in the articles. More particularly, the present invention relates to systems, apparatuses, and methods for identifying and authenticating articles using expression codes obtained from marks incorporating microparticles on or in articles, article packaging, or article labeling where the expression codes based on signature strings uniquely identify a given microparticle mark.

BACKGROUND OF THE INVENTION

Counterfeiting, tampering, and product diversion account for nearly a half-trillion dollars in worldwide business losses every year. While these business losses are staggering, public trust is also declining as a result of these problems. News stories documenting problems such as black market fraud, theft, gray market goods, and product tampering contribute to the dwindling public trust in the authenticity of goods and services.

Marks incorporating a multiplicity of microparticles ("microparticle marks") have been used in the past to combat counterfeiting, tampering, and product diversion. Microparticles have been used for identifying and authenticating many types of materials and objects, including the use of microparticles directly in bulk materials (e.g., fertilizer, chemicals, paints, oils, plastics, pigments, clays, fertilizers, and explosives), the use of marks incorporating a multiplicity of microparticles on or in containers for prepackaged materials (e.g., shampoo, conditioner, lotion, motor oils, and pharmaceuticals) and the use of marks incorporating a multiplicity of microparticles on individual product units (e.g. stereos, cameras, computers, videocassette recorders (VCRs), furniture, motorized vehicles, and livestock).

Since the late 1970's, multi-layered color-coded microparticles specifically have been used to covertly mark materials and objects. U.S. Pat. Nos. 4,053,433 and 4,390,452 and GB Patent No. 1,568,699 describe multi-layered color coded particles for marking articles. Specifically, U.S. Pat. No. 4,053,433 describes a method of marking a substance with microparticles encoded with an orderly sequence of visually distinguishable colored segments detectable with a microscope or other magnifying device. GB Patent No. 1,568,699 describes systems for making microparticles of layered colored material, which have generally parallel flat surfaces with irregular broken edges there between, enabling visualization of the code.

Other examples of multi-layered color-coded microparticles are described in U.S. Pat. Nos. 6,647,649 and 6,455,157, wherein each describes methods for generating microparticle codes from multi-layered color-coded microparticles. Additional types of microparticles are described in DE Patent No. 19,614,174 and U.S. Pat. No. 4,606,927. DE Patent No. 19,614,174 describes a process for producing multi-layered microparticles by forming a laminate sheet of colored layers and crushing the sheet. The individual marking layers are applied by a printing process, by bronzing, by spray painting, or by roll coating. U.S. Pat. No. 4,606,927 describes microparticles encased in a transparent solid matrix obtained by hardening a liquid adhesive.

While multi-layered color-coded microparticle marks have been useful in tamper and counterfeit detection, verification of articles using such marks has been a manual visual process using a microscope or other magnification system to permit a user to confirm the existence of the expected type of multi-layer color-coded microparticles within an area on an object where the microparticle mark is expected.

Automated reader systems have been developed for single expression microparticles, such as the readers for thermal or laser activated microparticle powders as described, for example, in PCT Pub. No. WO2005/104008A1. These single expression microparticle readers generally rely on both the "invisibility" of the microparticle until the microparticle is activated by the reader and the random location of the microparticles dispersed relative to a registration mark to create a unique code for the security and authentication purposes. Although such automated reader systems for identifying random patterns of single expression microparticles can be useful, the significantly higher level of complexity associated with automatically reading anything other than the presence and/or location of single expression microparticle marks has so far stymied the development of automated readers for multi-layer multi-color microparticle marks.

Using a unique set of multi-layered color-coded microparticles, such as those described in U.S. Pat. Nos. 6,647,649 and 6,455,157, a unique microparticle code can be created for a given article. While the multi-layered color-coded microparticles can be used in this manner to place a unique identification mechanism on individual articles, there is an inherent practical, albeit large, limit to the number of microparticle codes that can be written. To create more codes using multi-layered color-coded microparticles, additional layers, colors, or microparticles must be included in the microparticle set, wherein each of these can add cost and complexity to the system. As a result, a limit can exist at which the coding in this fashion can become impractical.

While the multi-layered color-coded microparticles described above can represent a first-level of security that is generally useful in protecting against counterfeiting, tampering, and product diversion, it can be anticipated that a day will come in which counterfeiters, tamperers, and diverters will attempt to breach this security level by recreating the multi-layered color-coded microparticles and placing counterfeit marks incorporating the multiplicity of microparticles on counterfeit or diverted products.

One attempt to create an additional level of security using multi-layered color-coded microparticles is described in U.S. Pat. No. 6,309,690, which describes a system and method that recognizes the random distribution of microparticles that occurs in applied microparticle marks. Using the method described in U.S. Pat. No. 6,309,690, by manually comparing an image of the mark taken at the time of the marking with an image of a mark manually obtained at a later time, one can attempt to determine whether the individual article is authentic.

While the method described by U.S. Pat. No. 6,309,690 can generally enable authenticating individual articles, it can suffer from a number of disadvantages. For example, the method requires the cumbersome manual comparison of an image of the mark taken at the time of the marking with an image of the mark obtained at a later time to determine whether the individual article is authentic. As data volume increases rapidly with increasing image resolution, the storage of very large amounts of data can be necessary for maintaining the images. Additionally, remote access to the images for field authentication requires the transfer of the entire image data to or from the field location, which can add substantial cost and time to the authentication process. Thus, the process described in U.S. Pat. No. 6,309,690 is generally not practical for real-time, large-volume applications because of the expensive and time-consuming nature of the process. Importantly, the method described by U.S. Pat. No. 6,309,690 first requires an identification of the article (i.e., one looking at a mark on an article must be told the identity of the article) before determining whether an article is authentic. If one does not know the identity of the article in the first place, then the authentication method described by U.S. Pat. No. 6,309,690 cannot be performed.

There is therefore a need for an improved anti-counterfeiting and anti-fraud marking system, apparatus, and method for identifying and authenticating articles that can overcome the inherent deficiencies with conventional marking systems and also enable serialization of articles over and above the microparticle code-formulation achievable with unique collections of multi-layered color-coded microparticles

SUMMARY OF THE INVENTION

The present invention overcomes the deficiencies with conventional anti-counterfeiting and anti-fraud marking systems by providing a system, apparatus, and method for identifying, authenticating, and serializing articles by capturing unique information from a mark incorporating microparticles. The information from the mark is used to create expression codes unique to that mark based upon signature strings. In one embodiment, the expression codes are stored for later retrieval and used to identify or authenticate the mark. In another embodiment, the expression code read by an automated reader is compared against a predetermined database of expression codes to identify or authenticate the mark.

Each time that a mark incorporating a multiplicity of microparticles is applied or incorporated into an article, article packaging, or article labeling, the unique characteristics of each and every microparticle mark are different. Specifically, when creating microparticles to be used in a microparticle mark, each of the microparticles will generally be randomly shaped by the grinding process. Thus, much like a snowflake, the size, shape, coloring, and fracture facets of each individual microparticle mark will make the expression of that microparticle mark unique from all other microparticle marks, even though the microparticle code represented by the microparticle(s) used to generate the microparticle mark may remain the same. Additionally, in some embodiments of the present invention by randomly depositing a mixture of the microparticles expressing multiple indicia in a carrier and "freezing" the particles within the carrier, each microparticle will remain fixed in a given random position and orientation within the mark. As a result, each unique microparticle mark is inherently different from all other microparticle marks and will generally represent and provide a unique expression of information different from all other microparticle marks.

Each of the unique expressions of information from the microparticle marks provides the inherent characteristics that are unique to that mark. The unique characteristics are those features that generally cannot be repeated from mark to mark. These unique characteristics can include, but are not limited to, individual microparticle properties such as: location, shape, colors, size, aspect ratio, orientation, texture, patterns, indicia, and other features. Additionally, the unique characteristics can also include, but are not limited to, macro-properties such as: the number of microparticles present and the overall color distribution of the image.

Therefore, once the microparticle mark has been applied on or incorporated into the article, article packaging, or article labeling, the usable unique characteristics, vis-à-vis signature strings, can be captured from the mark. Using the signature strings, one or more expression codes can be generated that are unique to that single microparticle mark and used to identify and authenticate the article and the mark (thus, a higher level of protection than just the microparticle code alone).

The generated expression codes can comprise a relatively small alphanumeric string determined from the information using an algorithm. The expression codes can be used to provide identification and authentication through comparison of the obtained string to a database of existing original alphanumeric strings rather than through comparisons of raw image data manually and directly. This process can therefore greatly minimize the amount of storage needed to save information about products and marks and also speed up the process by minimizing the amount of data that may need to be accessed remotely, as well as automatically comparing relatively small alphanumeric strings rather than manually comparing entire digital or analog images of the marks. In addition, a user need not know the identity of an article before authenticating that article, but rather can both identify and authenticate an article without prior identification.

The unique expression codes based upon the signature strings for the microparticle marks according to the various embodiments of the present invention also may enable serialization of products and thus further enable individual products, different lots, production locations, and/or distribution channels to be tracked and easily and economically verified.

The microparticle marks are adaptable to a wide range of products, including but not limited to the use of marks incorporating a multiplicity of microparticles on containers for prepackaged materials (e.g., shampoo, conditioner, lotion, motor oils, and pharmaceuticals), and on individual product units (e.g. stereos, cameras, computers, videocassette recorders (VCRs), furniture, motorized vehicles, livestock, auto and aircraft parts, pharmaceuticals, luxury products, credit and debit cards, identification (ID) cards, compact discs (CDs) and digital video discs (DVDs), agricultural seeds, and textiles). The microparticle marks can be placed on or in articles, article packaging, or in the article labeling so long as the microparticles within the mark are effectively frozen or locked in position as part of the mark.

In the field, information captured or acquired from a microparticle mark on an article can be utilized to generate an expression code based upon signature strings related to features and relationships of a multiplicity of microparticles for the individual valid microparticles associated with that mark. In one embodiment of the present invention, in order for a microparticle mark to be authenticated, the expression code is compared to stored expression codes obtained from authentic marked products in a process that requires the unique expression code for the mark to possess a certain number of attributes that match attributes associated with a stored expression code for an authentic microparticle mark.

In one embodiment of the present invention, a method for automatically generating at least one expression code that is unique to a microparticle mark that includes a multiplicity of microparticles and is adapted to be scanned by an automated reader is disclosed.

One aspect of this embodiment involves identifying each of the multiplicity of microparticles in the microparticle mark by examining at least two different indicia expressed by the microparticle and comparing the at least two different indicia to predetermined indicia associated with the microparticle being a valid microparticle. In this aspect, the at least two different indicia represent information other than a location of the microparticle that are adapted to be determined by the automated reader. At least one signature string is generated that is representative of at least one feature relationship among only the valid microparticles of the multiplicity of microparticles in the microparticle mark. A processing system is used to generate at least one expression code for the microparticle mark based on the at least one signature string and the expression code is stored in a storage system. The storage system can be accessed to utilize the at least one expression code to verify the authenticity of a microparticle mark as scanned by the automated reader, such that a tangible indication of the authenticity of the microparticle mark is generated.

Another aspect of this embodiment generates at least one microparticle code representative of at least one microparticle in the microparticle mark and also generates at least one signature string code representative of at least one feature relationship among a multiplicity of microparticles in the microparticle mark. A processing system is used to generate at least one expression code for the microparticle mark based on a subset of codes containing at least one of the at least one microparticle code and at least one of the at least one signature string code. The expression code can be stored in a storage system for use in verifying the authenticity of a microparticle mark.

Another aspect of this embodiment determines whether each of the multiplicity of microparticles in the microparticle mark presents a valid microparticle by comparing at least two different colors expressed by the microparticle to a predetermined arrangement of colors associated with the microparticle being a valid microparticle. At least one signature string is generated that is representative of a relative location feature among only the valid microparticles of the multiplicity of microparticles in the microparticle mark. A processing system is used to generate at least one expression code for the microparticle mark based on the at least one signature string. The expression code can be stored in a storage system for use in verifying the authenticity of a microparticle mark.

Still another aspect of this embodiment generates at least two signature strings, each signature string representative of a relative location feature among only the valid microparticles of the multiplicity of microparticles in the microparticle mark. A processing system is used to generate at least one expression code for the microparticle mark based on the at least two signature strings. The expression code can be stored in a storage system for use in verifying the authenticity of a microparticle mark.

A further aspect of this embodiment generates at least one signature string representative of a relative location feature among only the valid microparticles of the multiplicity of microparticles in the microparticle mark without information for background areas of the microparticle mark other than locations of the microparticles and without using a registration framework. A processing system is used to generate at least one expression code for the microparticle mark based on the at least one signature string. The expression code can be stored in a storage system for use in verifying the authenticity of a microparticle mark.

In another embodiment of the present invention, a method for automatically verifying at least one expression code that is unique to a microparticle mark that includes a multiplicity of microparticles is disclosed. This embodiment uses an automated reader to scan the microparticle mark.

In one aspect of this embodiment, the automated reader determines whether each of the multiplicity of microparticles in the microparticle mark presents a valid microparticle by examining at least two different indicia representing information other than a location of the microparticle that are expressed by the microparticle and comparing the at least two different indicia to at least two predetermined indicia stored in the automated reader that represent a valid microparticle. At least one signature string is generated representative of at least one feature relationship among only the valid microparticles of the multiplicity of microparticles in the microparticle mark, the at least one signature string being generated based on at least one predetermined feature relationship stored in the automated reader that represent a valid signature string. At least one expression code is generated for the microparticle mark based on the at least one signature string and compared to a predetermined database of valid expression codes to determine if a match exists between the at least one expression code and the predetermined database as the authenticity of the microparticle mark.

In another aspect of this embodiment, at least one microparticle code is generated representative of at least one microparticle in the microparticle mark representative of at least two different indicia expressed by the microparticle and compared to a set of valid microparticle codes stored in the automated reader. At least one signature string code is generated representative of at least one feature relationship among a multiplicity of microparticles in the microparticle mark, the at least one signature string being generated based on at least one predetermined feature relationship stored in the automated reader that represent a valid signature string. At least one expression code is generated for the microparticle mark based on a subset of codes containing at least one of the at least one microparticle code and at least one of the at least one signature string code that can be compared to a predetermined database of valid expression codes to determine if a match exists between the at least one expression code and the predetermined database as the authenticity of the microparticle mark.

In another aspect of this embodiment, the automated reader determines whether each of the multiplicity of microparticles in the microparticle mark presents a valid microparticle by comparing at least two different colors expressed by the microparticle to a predetermined arrangement of colors associated with the microparticle being a valid microparticle. At least one signature string is generated representative of a relative location feature among only the valid microparticles of the multiplicity of microparticles in the microparticle mark. At least one expression code is generated for the microparticle mark based on the at least one signature string that can be compared to a predetermined database of valid expression codes to determine if a match exists between the at least one expression code and the predetermined database as the authenticity of the microparticle mark.

In still another aspect of this embodiment, the automated reader generates at least two signature strings, each signature string representative of a relative location feature among only the valid microparticles of the multiplicity of microparticles in the microparticle mark. At least one expression code is generated for the microparticle mark based on the at least two signature strings that can be compared to a predetermined database of valid expression codes to determine if a match exists between the at least one expression code and the predetermined database as the authenticity of the microparticle mark.

In a further aspect of this embodiment, the automated reader generates at least one signature string representative of a relative location feature among only the valid microparticles of the multiplicity of microparticles in the microparticle mark without information for background areas of the microparticle mark other than locations of the microparticles and without using a registration framework. At least one expression code is generated for the microparticle mark based on the at least one signature string that can be compared to a predetermined database of valid expression codes to determine if a match exists between the at least one expression code and the predetermined database as the authenticity of the microparticle mark.

In one embodiment, the match can be a match between a minimum number of attributes for a signature string of a single microparticle mark as scanned in the field (field mark) and the attributes of a signature string of the microparticle mark scanned when the mark was originally applied to an article and stored in a database. For example, a reader can be used to search for an individual microparticle in the microparticle mark that possesses a signature string with certain number of matching attributes with a signature string of a microparticle in a valid mark. In this embodiment, a single signature string match can be enough to authenticate a mark. However, in other embodiments, it can be required that that the signature strings of two, three, or any number of microparticles be matched before a mark is authenticated or that an expression code based on a combination of a plurality of signature strings must be matched. In one embodiment, once a first attribute or vector of a microparticle signature string has been matched, the results can then be used to narrow the search field for one or more additional matching microparticle signature strings that possess a certain number of matching attributes or vectors with a microparticle signature string in a valid mark.

In one embodiment, the number of matching attributes required for each microparticle signature string to be declared a match can be set to a first confidence level. In addition, the required number of matching microparticle signature strings for each mark can be set to a second confidence level. The combination of the first and second confidence levels can be used to create dynamically-adjustable confidence bands. If a field mark falls above the selected confidence band, it can be determined to be authentic. If a field mark falls below the selected confidence band, it can be determined to not be authentic. The first and second confidence levels and the confidence bands can be dynamically adjusted according to a number of variables, including, as examples: (1) expense of transaction and (2) desired speed of transaction. For example, in a $10.00 transaction, the first and second confidence levels and therefore the confidence bands can be set to a relatively low level. On the other hand, in a $100,000 transaction, the first and second confidence levels and therefore the confidence bands can be set to a relatively high level.

Using the identification and authentication method of one embodiment of the present invention, the level of security afforded when using multi-layered color-coded microparticle marks can be extended to provide a level of protection in addition to the first-level microparticle codes. The various embodiments of the present invention provides for expression codes based on signature strings generated relative to attributes of valid individual microparticles that can be quickly, accurately, and automatically acquired, stored, and accessed to determine the identity and authenticity of an article. In addition, the signature strings can generate expression codes that can be used to serialize products having the microparticle marks, including, for example, microparticle marks comprised of a common set of multi-layered color-coded microparticles (i.e., a common, first level microparticle code) used for marking a given product line.

BRIEF DESCRIPTION OF THE DRAWINGS

The invention may be more completely understood in consideration of the following detailed description of various embodiments of the invention in connection with the accompanying drawings, in which:

FIG. 7 is a block diagram of the identification/authentication method according to an embodiment of the present invention;

Figure 1:
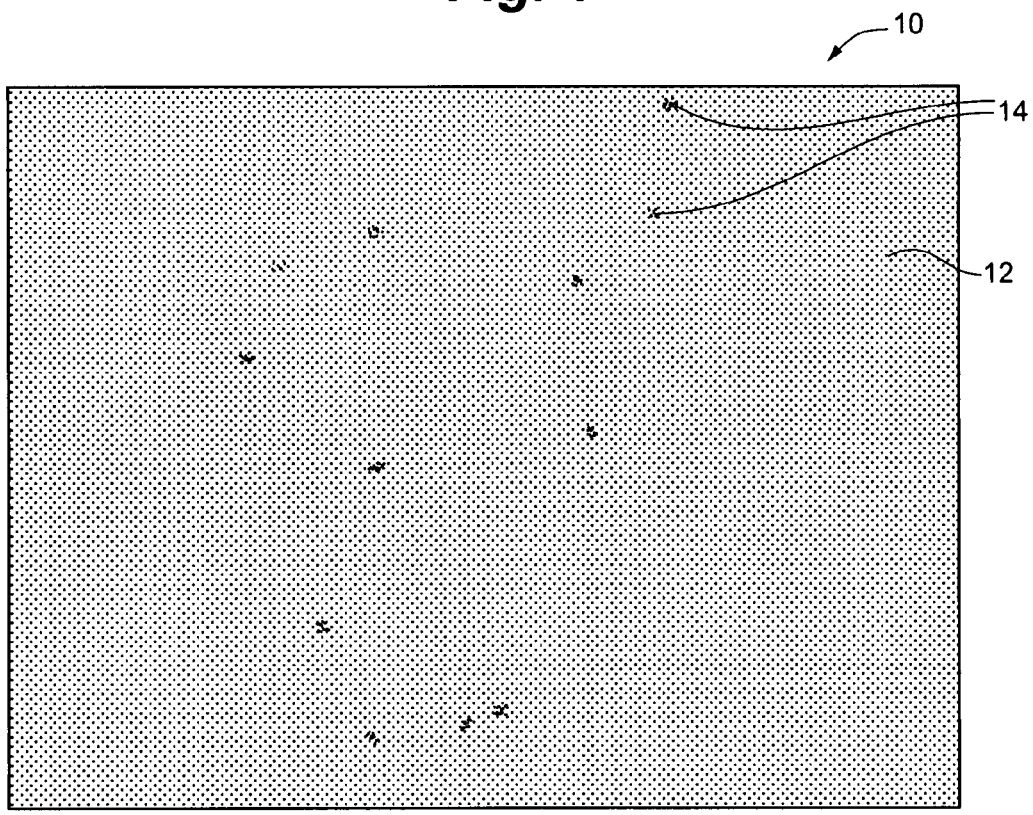
FIG. 1 is an image of a microparticle mark according to a first embodiment of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF THE PREFERRED EMBODIMENTS

Microparticle Mark Structure

As described herein, the various embodiments of the present invention relate to a system, apparatus, and method, for identifying and authenticating articles using expression codes obtained from marks incorporating one or more microparticles on or in articles, article packaging, or article labeling.

In various embodiments of the present invention, expression codes may be derived from a single signature string, a combination of at least one microparticle code and one signature string, or multiple signature strings. A signature string is a set of information derived from one or more features and/or attributes of a plurality of valid microparticles in a microparticle mark. A microparticle code generally refers to a code generated by analyzing multiple aspects of information derivable for a given microparticle mark, for example, by an automated reader, other than those random aspects of information that generally cannot be repeated from mark to mark.

For purposes of the present invention, "microparticles" are any relatively small particles comprising sizes, shapes, colors, and other features described below. The term "microparticles" is not limited to multi-layered multi-colored particles unless expressly indicated and in some embodiments may include microparticles having only a single expression.

Figure 2:
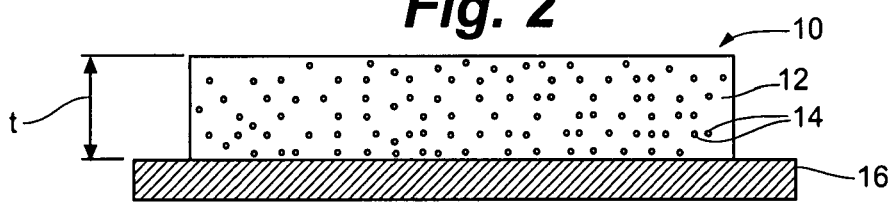
FIG. 2 is a cross-sectional view of the microparticle mark of FIG. 1.

Referring to FIGS. 1 and 2, an authentic microparticle mark 10 according to a first embodiment generally comprises a carrier material 12 and microparticles 14 dispersed in the carrier material and presented on a substrate 16. In one embodiment, the microparticles 14 can be dispersed generally uniformly, yet randomly located and oriented, throughout the carrier material 12.

The microparticle mark 10 according to this first embodiment generally comprises a single carrier layer 12 presented on a substrate 16, the microparticles 14 being substantially homogenously dispersed therein. In the various embodiments described herein, the substrate can comprise the article to be authenticated directly, its packaging, its labeling, etc. Alternatively, the substrate may include other security devices, such as a hologram, RFID tag, a bar code, or any other identification or reference indicia.

Figure 3:
FIG. 3 is a cross-sectional view of a microparticle mark according to a second embodiment depicting the structure of the microparticle mark.

Referring to FIG. 3, an authentic microparticle mark 20 according to a second embodiment generally comprises microparticles 24 dispersed on an adhesive or coating material 22 and generally presented on a substrate 26. The microparticles 24 in this second embodiment can be dispersed generally uniformly, yet randomly located and oriented on the carrier material 22.

Figure 4:
FIG. 4 is a cross-sectional view of a microparticle mark according to a third embodiment depicting the structure of the microparticle mark.

Referring to FIG. 4, an authentic microparticle mark 30 according to a third embodiment generally comprises microparticles 34 dispersed directly on a substrate 36. The microparticles 34 can be projected towards the substrate 36 with a low, medium, or high velocity, such that the microparticles 34 are at least partially embedded into or onto the substrate material. The velocity of the projection can depend upon the relative hardness of the substrate. The microparticles 34 in this third embodiment can be dispersed generally uniformly, yet randomly located and oriented in or on the substrate 36.

Figure 5:
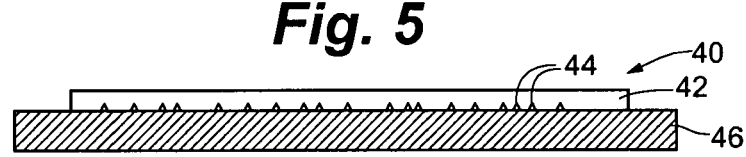
FIG. 5 is a cross-sectional view of a microparticle mark according to a fourth embodiment depicting the structure of the microparticle mark.

Referring to FIG. 5, an authentic microparticle mark 40 according to a fourth embodiment is similar to that of the microparticle mark 30 according to the third embodiment, except that the microparticles can be partially or fully covered with coating material 42 to retain the microparticles 44 dispersed on the substrate 46. Such a carrier material 42 can include an adhesive or coating. The microparticles 44 in this fourth embodiment can be dispersed generally uniformly but randomly located and oriented on the substrate 46.

Figure 6A:
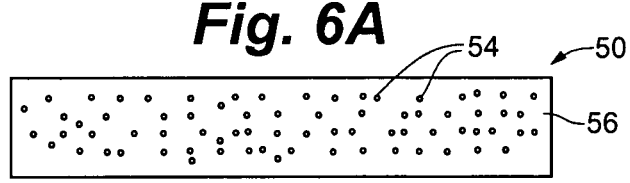
FIG. 6A is a cross-sectional view of a microparticle mark according to a fifth embodiment depicting the structure of the microparticle mark.
Figure 6B:
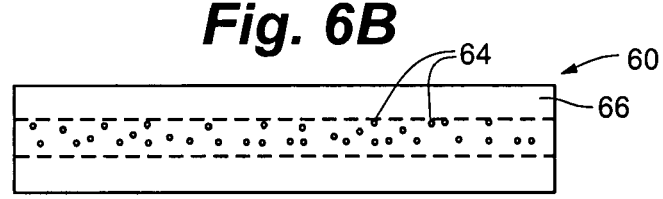
FIG. 6B is a cross-sectional view of a microparticle mark according to a sixth embodiment depicting the structure of the microparticle mark.

Referring to FIGS. 6A and 6B, authentic microparticle marks 50, 60 according to fifth and sixth embodiments generally comprise microparticles 54, 56 dispersed in a substrate 56, 66. The microparticles 54 in the fifth embodiment can be dispersed generally uniformly, yet randomly located and oriented throughout the thickness of the substrate 56 as depicted in FIG. 6A. The microparticles 64 in the sixth embodiment can be dispersed uniformly, yet randomly located and oriented within a layer of the substrate 66 as depicted in FIG. 6B. It will be understood that the layer containing the microparticles may be sandwiched between other layers of the substrate without microparticles, or the layer may be adjacent a surface of the substrate, or there may be multiple layers.

In any of the embodiments described above, the microparticles can be dispersed generally uniformly but randomly located and oriented throughout the carrier material or substrate. Alternatively, in other embodiments at least some of the microparticles may be intentionally located at predetermined locations and/or patterns within the carrier material or substrate. Such intentionally positioned microparticles can form a registration and/or identification pattern to be used in conjunction with the scanning of other randomly oriented microparticles as part of the microparticle mark, or can be comprise the microparticles of the microparticle mark. In still other embodiments, at least some of the microparticles may be pseudo randomly positioned in the carrier material or substrate, such as preferentially doping some areas/volumes with higher concentration of microparticles than other areas/volumes.

While not limited to such, the microparticles used for the microparticle marks according to the various embodiments of the present invention can comprise multi-layered color-coded microparticles. Examples of such multi-layered color-coded microparticles capable of expressing a first-level microparticle code are described in U.S. Pat. Nos. 4,053,433, 4,390,452, 4,606,927, 6,309,690, 6,455,157, 6,647,649, 6,620,360, Great Britain Patent No. GB 1,568,699, and German Patent No. DE 19614174, all of which are incorporated herein by reference in their entirety. It will be understood that for purposes of an embodiment of the present invention, existing microparticles are considered capable of generating a first-level microparticle code if the microparticle mark method and system in which these microparticles are being utilized enables observation, viewing or reading of each microparticle in such a way as to express more than a binary state employing that single microparticle. For example, a multi-layer, multi-color microparticle coding system having 4 particles per code layer and formulated with 12 color possibilities would be capable of expressing up to 9,834,496 unique combinations of color arrangements, each of which would represent a different microparticle code from within that individual microparticle coding system.

Alternatively, the powder microparticles as described, for example, in PCT Pub. No. WO2005/104008A1 could be utilized in accordance with the teachings of the present invention. However, such single expression microparticles express only a binary state for a given microparticle (i.e., is the microparticle present or not). Thus, existing automatic readers can only be effectively considered to present a zero-level (binary) code for an individual microparticle. In a similar manner, existing magnetic and electronic security system can also be considered as having individual particles, typically ferromagnetic particles, that are single expression/binary microparticles. While existing automatic readers for such single expression microparticles can generate longer and more complex codes by using positional information associated with a multiplicity of such single expression microparticles, these readers would need to be equipped with additional features and/or capabilities in order to be able to generate and/or utilize the signature strings as described in accordance with the teachings of some of the embodiments of the present invention.

The microparticles can comprise additional characteristics that are further usable in generating an expression code based on signature strings for individual microparticles. Such additional characteristics include, for example, text or other indicia on one or more of the microparticle surfaces, reflectivity, various microparticle shapes, refractive index, surface geometry or finish, dynamic crystal lattice properties (such as magneto-electrooptic properties, mechanical-electrooptic properties or thermal-electrooptic properties associated with lattice structures such as LCD or piezoelectric materials), and various optical properties including polarization.

In embodiments comprising multi-layered color-coded microparticles or in other embodiments, the microparticles used for the microparticle marks can comprise one or more reflective layers and/or one or more non-reflective surfaces. For example, the multi-layered color-coded microparticles can include a reflective layer at one end thereof and a non-reflective layer at the other end thereof, with one or more intermediate multi-colored layers there between. In other embodiments, the microparticles can include a reflective layer at one end thereof and a non-reflective layer at the other end thereof, with no multi-colored layers there between.

In the embodiments in which the microparticles comprise reflective surfaces, the reflective properties of the microparticles can be such that any reflection off of the reflective surfaces is not detectable by a naked eye, but is detectable under magnification to retain the covertness of the microparticle mark. In other embodiments, the reflective properties of the microparticles can be detectable by a naked eye or under any type of low magnification. This can be used in marks in which it is desirable to warn any potential counterfeiters that the product, packaging, or labeling contains a microparticle mark as depicted and described herein. In these embodiments, the microparticles comprising reflective surfaces can be arranged to form words, marks, or other indicia that can be detectable by a naked eye or under any type of low magnification.

In other embodiments, combinations of more than one kind of microparticles as previously described may be utilized as part of the microparticle mark. For example, multi-colored microparticles may be combined with reflective microparticles, where the reflective microparticles are utilized to verify the authenticity of the microparticle mark and the multi-colored microparticles are used to identify the particular microparticle mark.

In one embodiment, microparticle marks on or in articles, article packaging, or article labeling in accordance with the present invention, can be authenticated by verifying that the marks have authentic, three-dimensional objects such as microparticles, such as is described in the patent application entitled, "THREE-DIMENSIONAL AUTHENTICATION OF MICROPARTICLE MARK," attached as Appendix A and incorporated herein by reference in its entirety.

In further embodiments, the microparticles used for the microparticle marks can comprise one or more generally clear or lucid (transparent or translucent) layers therein. The clear or lucid layers can further aid in generating expression codes based on signature strings.

In other embodiments, the microparticles used for the microparticle marks can comprise one or more generally dynamic crystal lattice layers or components. The dynamic crystal lattice layers or components can further aid in authenticating, hiding and/or or detecting expression codes based on signature strings.

For many applications, microparticles are about 0.1 micron to about 500 microns at their average cross section dimension, preferably about 0.1 micron to about 100 microns, and optimally in ranges of about 1 micron to about 10 microns, about 10 microns to about 20 microns, about 20 microns to about 40 microns, and about 40 microns to about 100 micrometers. The size of the microparticles can depend upon the applications, for example, in printing applications it can be desirable to have microparticles of less than about 10 microns. A person of ordinary skill in the art will recognize that additional ranges within the explicit ranges given above are contemplated and are within the present disclosure.

The microparticles can have various aspect ratios. In an embodiment, the microparticles have an aspect ratio of approximately 1:1. By having such an aspect ratio, the microparticles may be more easily applied and randomly oriented within or on a carrier, adhesive, or coating, or on a substrate. This can be important when generating expression codes based on signature strings. In other embodiments, the microparticles have an aspect ratio of approximately 1:2. In further embodiments, the microparticles have an aspect ratio of approximately 1:4, 1:8, or 1:16. A person of ordinary skill in the art will recognize that additional aspect ratios within the explicit aspect ratios given above are contemplated and are within the present disclosure.

The concentration of microparticles used to identify an object can also vary. For example, the microparticles might be incorporated directly into the article, its packaging, or its labeling at a concentration of 0.0001 to 10 parts by weight for every 100 parts by weight material, and in another embodiment at a concentration of 0.001 to 3 parts by weight for every 100 part by weight material. Alternatively, the microparticles can be combined with an adhesive or carrier at a concentration of 0.0001 to 10 parts by weight for every 100 parts by weight material, and in another embodiment at a concentration of 0.001 to 3 parts by weight for every 100 part by weight material. A person of ordinary skill in the art will recognize that additional ranges within the explicit ranges given above are contemplated and are within the present disclosure.

The overall area and volume proportions in the various cross sections of the mark (e.g., % area carrier or substrate to % area microparticles) can be selected to optimize the detection capability of a reader to pick up the unique characteristics of a mark. Based upon the uniqueness of the marks, the overall area and volume proportions (e.g., % volume carrier or substrate to % volume microparticles) in the various cross sections of the mark can also be selected to optimize the ability to serialize articles using the expression codes generated from the mark.

In an embodiment, a mark comprises about 99.999% area carrier or substrate to about 0.001% area microparticles. In another embodiment, a mark comprises about 99.99% area carrier or substrate to about 0.01% area microparticles. In another embodiment, a mark comprises about 99.9% area carrier or substrate to about 0.1% area microparticles. In still another embodiment, a mark comprises about 99% area carrier or substrate to about 1% area microparticles. These levels can enable optimization of the detection capability of a reader to pick up the unique characteristics of a mark and the ability to serialize articles using the expression codes generated from the mark, but also can cut down on microparticle costs. A person of ordinary skill in the art will recognize that additional area ratios within the explicit area ratios given above are contemplated and are within the present disclosure.

In general, the larger-sized particles can require a larger weight and proportion of microparticles for detection and determination capability. Accordingly, the smaller-sized particle can require a smaller weight and proportion of microparticles for detection and determination capability.

In terms of quantifying the number of microparticles within a mark, a mark can have at least one microparticle and up to any number of microparticles. This number can be determined based on the requirements for unique microparticle codes and expression codes for a specific application.

In one embodiment, a mark comprises 1-10 microparticles. In another example embodiment, a mark comprises 11-40 microparticles. In another example embodiment, a mark comprising 41 or more microparticles, where each multiplicity of microparticles provides a microparticle code and the positions, features, and/or relationships of the individual microparticles is utilized to generate one or more signatures strings, which can be used to generate one or more second-level expression codes for the microparticle mark. In one embodiment, the signature strings and microparticle codes can be used to generate a unique expression code for that microparticle mark.

In one embodiment, a microparticle code can require more than one kind of microparticle. For example, a two-digit code may require two microparticles, a three-digit code may requires three microparticles, and so on. For each digit, it may be desirable to have more than one instance of the digit so that the quality of a reading is enhanced. In another embodiment, a single kind of microparticle having three, four, five or more different colors may be utilized to generate a multiple digit microparticle code. In still another embodiment, multiple microparticle codes may be obtained from different kinds of microparticles and incorporated into the expression code. The number and kinds of microparticles used can be determined based upon the expression codes and signature strings generated relative to attributes of valid individual microparticles and the matching therefor described in greater detail below.

In one embodiment, the adhesive, carrier, or substrate material can be transparent or translucent to the frequency of light used to illuminate the microparticles, such that the microparticles are readily discernable. The adhesive or carrier can include solvent materials, including both organic solvent based adhesives such as lacquers, as well as water based adhesives such as latexes, hot melt adhesives, curing systems including epoxies, polyurethanes, enamels, such as, for example, acrylic and alkyds, or a UV curing material. UV curing materials can enable application of the carrier material with microparticles in high volume applications, due to the quick curing ability.

Unique Expression Code Setup and Field Reading

Referring to FIG. 7, a block diagram of one embodiment of the microparticle mark expression code identification/authentication process is depicted. The process broadly includes (1) original expression code setup and (2) field reading of a field mark's expression code. Original expression code setup generally includes (a) capturing information from the microparticle mark, (b) processing the information from the microparticle mark to obtain at least one expression code unique to the mark based on signature strings for the mark, and (c) storing the processed expression code(s) for the microparticle mark, such as in a database.

The steps described hereinbelow are used to capture and process the information from the microparticle mark to obtain an expression code based on signature strings generated relative to attributes of a plurality of valid individual microparticles included in the mark. The expression codes can then be used to determine the identity and/or authenticity of an article in the field by comparing the expression code for the mark in the field with the expression code(s) of an authentic mark in a database. The expression codes can also be used to serialize the mark and/or article because the one or more expression codes for a given mark will be unique to that mark. It will be understood that in other embodiments, the signature strings are stored instead of, or in addition to, the expression code.

In one embodiment, a sensor can be used to capture light from an optics path and generate an electronic image of an entire valid mark or a portion of the mark. In one embodiment, the field of vision of the sensor used to generate the electronic image is substantially all of the mark, including the periphery of the mark or a section of the mark that can be indexed and easily aligned to in the future. The sensor is generally an imaging sensor such as CCD, CMOS, etc, but other imaging sensors may also be used in connection with the present invention.

Using an image processing program, various attributes for the individual microparticles within a mark can be determined and used to generate an expression code based on signature strings from the microparticle. Such microparticle attributes include, for examples: (1) the size of the microparticle, (2) length of microparticle perimeter, (3) aspect ratio of the microparticle, (4) major axis of the microparticle, (5) minor axis of the microparticle, (6) average color of the microparticle, (7) shape of the microparticle, (8) texture of the microparticle (e.g., smooth, rough, gloss), pattern of the microparticle (e.g., striped, circular, layered, solid, spotted, woven), indicia on the microparticle (e.g., text and graphics), and (8) the orientation of the microparticle.

A signature string for each of the individual microparticles can be generated based upon one or more of the above various attributes, which can then optionally be used to generate an expression code associated with the individual microparticle mark.

In embodiments in which multi-layer multi-color microparticles are used, the following microparticle attributes can be determined in addition to the all of the above-listed attributes for each layer region: (1) the locations of each of the individual microparticle layers, (2) the size of each of the microparticle layers, (3) the aspect ratio of the microparticle layer, and (4) the orientation of the pixel groupings.

The image processing program can be used to choose to re-include data that might have been filtered during determination of the microparticle code, but which is associated with unique features that cannot be repeated from expression to expression and thus can be useful for generation of an expression code. The above image processing program can be used to generate signature strings for selected valid microparticles or all of the valid microparticles in an original, authentic mark. The more signature strings for microparticles that are selected, the larger amount of storage is needed to store the information associated with a given authenticated mark.

Other Mark Information in the Absence of a Reference Mark

As will be described, the image processing program can also analyze the electronic image of all or part of a microparticle mark to determine the location of each independent microparticle within the mark. This information can provide an additional level of confidence when analyzing and comparing a mark on an article in the field to determine its identity or authenticity.

Figure 8:
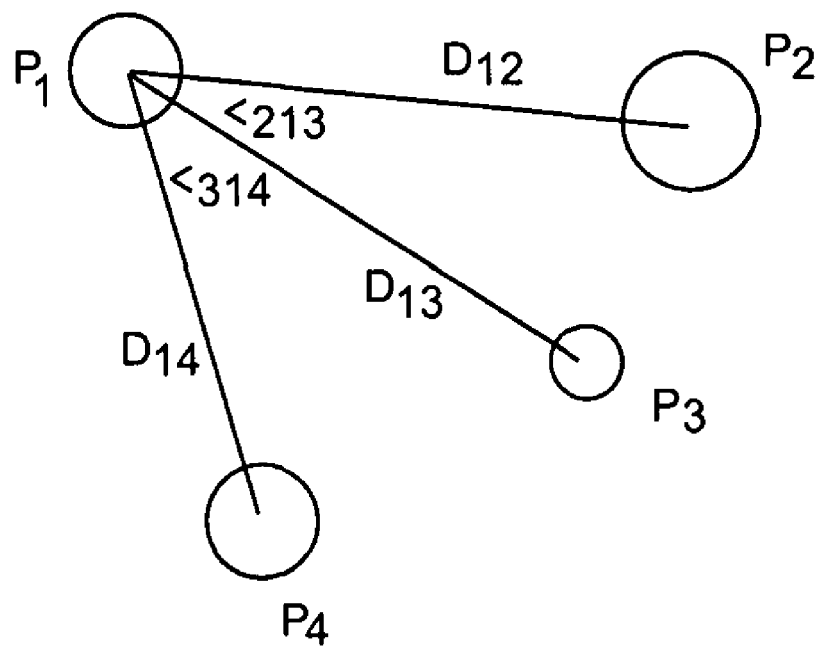
FIG. 8 is a schematic view of capturing signature string information reading without a reference mark.

Referring to FIG. 8, the relative locations will generally be unique for each microparticle mark and thus can form the basis for generating an expression code based on signature strings for the mark. In the absence of a reference mark, determining the relative location of each independent microparticle within the mark can be done by first calculating the centroid of each of the known microparticles and determining the relative positions of the calculated centroids. An additional signature string for the mark itself can then be generated based upon the relative locations of each of the independent microparticles within the mark.

As depicted, $D_{12}$ is the distance between particles $P_1$ and $P_2$, $D_{13}$ is the distance between particles $P_1$ and $P_3$, and $D_{14}$ is the distance between particles $P_1$ and $P_4$. While the absolute distances between each microparticle and its related microparticles can vary due to scaling or indexing variations, the ratios of these distances can be determined and will remain relatively constant.

Further, referring to FIG. 8, again starting from each of the microparticles identified in the applied mark, the angles formed between each microparticle and its related microparticles can be determined and used for calculating an expression code. As depicted, angle 213 is the angle between particles $P_2$, $P_1$, and $P_3$ and angle 314 is the angle between particles $P_3$, $P_1$, and $P_4$. These angles will also remain constant, despite scaling and indexing variations. The angle relationships for each microparticle mark thus can form the basis for generating an expression code based on signature strings for the mark.

Attribute data and relative location data for microparticles can be used to generate signature strings. In an embodiment, one microparticle with its attributes can act as a starting point. This microparticle and its attributes can be related to neighboring microparticles, with their attributes. Attribute data and location data can be compared and matched. A signature string can thus be generated by relating a single microparticle to neighboring microparticles. A distance may be specified for searching out neighbors. In one embodiment, from the microparticles of interest, a set of desired relationships can be generated such as, distances, angles, and other attributes of the microparticles. From a single microparticle, for example, a star pattern can be generated. Microparticle pairings can also be used to generate signature strings. In one version of this embodiment, all possible pairs can be generated within a certain distance threshold to determine microparticle pairing. For example, two particles with certain aspects separated by a certain distance. Or three particles with certain aspects separated by a certain distance may be grouped, thus forming triangle patterns.

Figure 16:
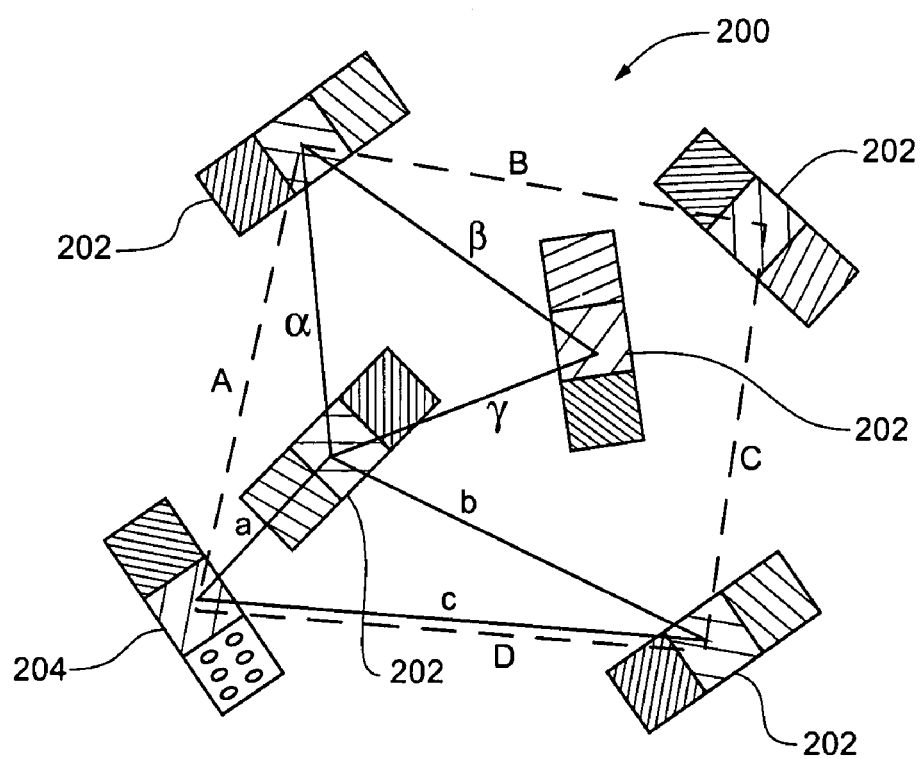
FIG. 16 is an illustrative example of patterns that could be used to derive signature strings from a multiplicity of microparticles.

FIG. 16 shows how the relationships between individual microparticles 202 can be used to derive signature strings. Using the centroid of each microparticle 202, 204 as a reference, the generally rectangular shape defined by lines A, B, C, and D can be formed. Using the centroids joined by lines alpha, beta, and gamma forms a triangle shape between three microparticles 202. Another triangle shape can be formed from the centroids of microparticles 202, 204 using lines a, b, and c. These patterns are illustrative only, since the relative position of microparticles 202, 204 can be used to generate a very large number of possible patterns that can be used as signature strings. Microparticle 204 is shown to illustrate that not all microparticles used need have the same or even similar attributes.

Other Mark Information with the Use of Reference Mark

While generally not necessary, one or more reference marks can be added to the article as part of the marking process, as existing marks on the article (e.g., label characters), or as new marks introduced on the article during any of the previous processing of the article (e.g. printing, packaging, or labeling operations). The reference mark can serve one or more of the following purposes: (1) provide indicia for orienting the image properly for further processing, (2) provide indicia for determining location, and (3) provide indicia for scaling or rotating the image for further processing.

Figure 9:
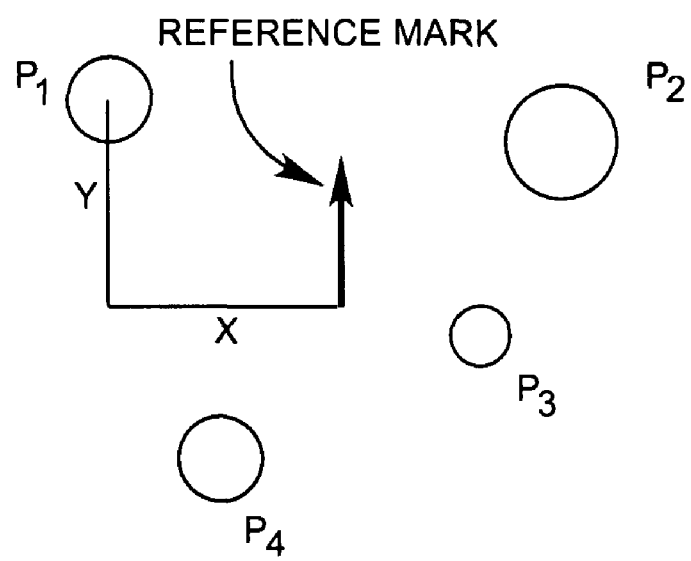
FIG. 9 is a schematic view of capturing signature string information reading with a reference mark.

For example, referring to FIG. 9, once the reference mark is located, the processing program can record its X and Y coordinates and fix that point as the origin of a rectangular Cartesian coordinate system. The origin can subsequently be used to assign relative address information to all other geometric features of the particle field. Thus, the centroids of all microparticles in the image can be assigned X and Y distances from the origin for later authentication.

Further, a reference mark can also serve as a method of normalizing a linear scale from image to image of the same mark. When digital images are taken of the mark, there will generally be variations in linear scale due to differences from camera to camera and from indexing variations on the same reader. To alleviate any potential inconsistencies, each time a digital image is captured for analysis, the image can be "rescaled" with respect to the linear distance of a designated feature of the reference mark. Any feature that remains constant over time can be chosen, such as the greatest overall length of the mark. That distance is recognized as a number of pixels by the image processing program, and all other dimensions in that image can be normalized to scale by using that number of pixels as a coefficient-of-length for all other distance calculations. In other words, each time an image of the particle field is acquired, the number of pixels that are occupied by the major axis of the reference mark is used as unity for all linear calculations. This can ensure that when an image is taken with any camera, the relative dimensional values that are derived from that image are always the same.

Figure 10:
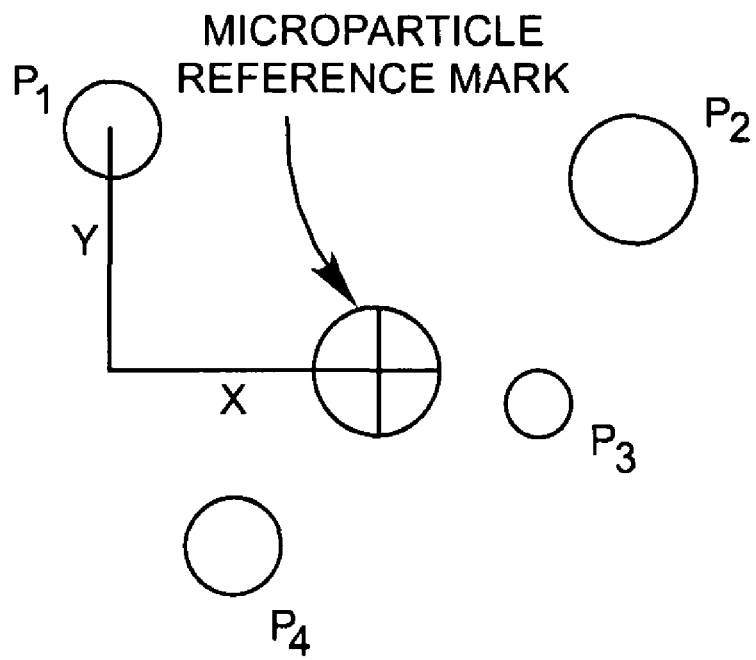
FIG. 10 is a schematic view of capturing signature string information with an identified microparticle being used as a reference mark.

Under some circumstances, providing a reference mark might not be advantageous. While reference indicia might already be present on the article, such as label text or graphics, in some circumstances, suitable reference indicia might not already be present on the article or might not be in the desired location for the mark. FIG. 10 shows one example for how to create a self-referenced microparticle mark once at least one microparticle in the mark has been identified, e.g., based on an algorithm to identify a single microparticle in the mark (such as a microparticle with a specified size). In this embodiment, the initial microparticle identified for a given mark by an algorithm can serve as a reference mark for resolving/authenticating other microparticles in the mark as the relationship among the microparticles for a given mark will be known and resolvable based on the signature strings of each of the microparticle.

Thus, as illustrated above, the various embodiments of the present invention include a method of obtaining suitable microparticle unique characteristics with a reference mark or in the absence of a reference mark. While examples have been provided that demonstrate the capture of unique characteristics in the absence of a reference mark, those skilled in the art will recognize that other examples and embodiments can be used.

The information obtainable using a reference mark (either actual or through the use of an identified microparticle) will also generally be unique for each microparticle mark and thus can form the basis for generating an expression code based on signature strings for the mark. Such information includes: (1) the location of each independent microparticle within the mark, (2) the relative locations of a microparticle and its related microparticles, (3) angles formed between each microparticle its related microparticles, and (4) the relative size of the microparticle and its related microparticles.

Figure 11:
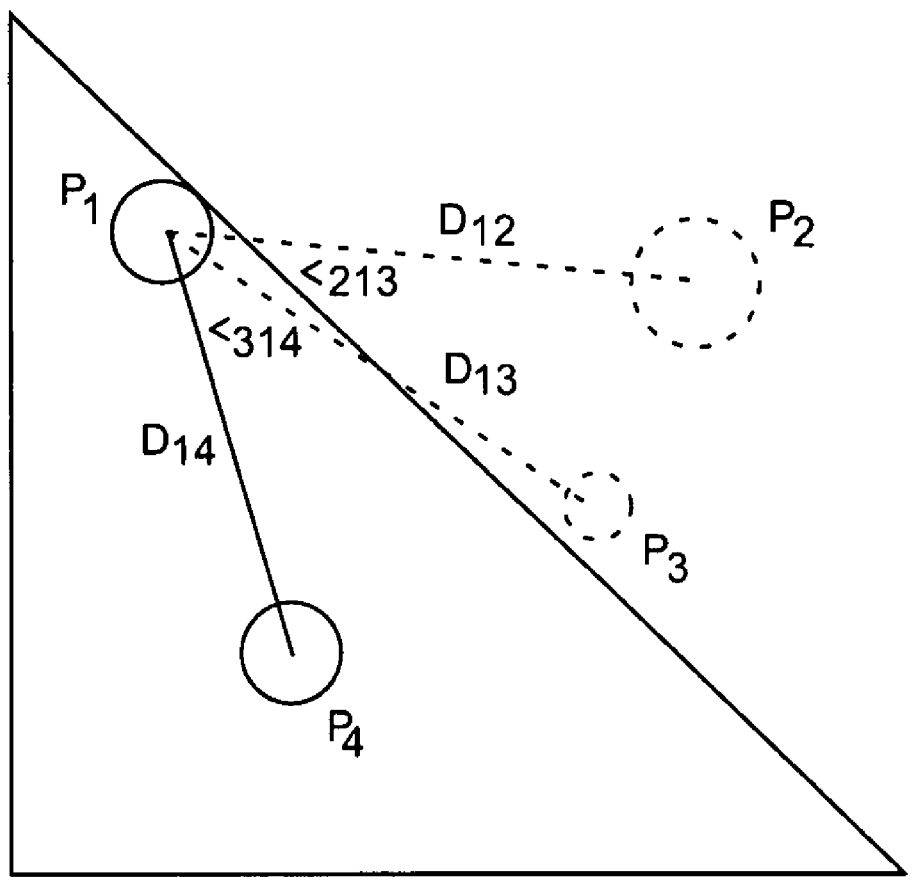
FIG. 11 is a schematic view of capturing a signature string information reading with a geometric filter key.

The processing of the above unique characteristics to generate the alphanumeric string or code can utilize a secure "key", such that only authorized transactions using the proper secured "key" are completed successfully. This additional security can take the form of the application of an encryption key after the unique characteristics processing. Alternatively, the key can also impact the way unique characteristics are processed to generate the expression code. The key to be employed in a given transaction can also be rotated or specified in real time by the central database directing the remote reader to process the unique characteristics in a certain fashion. Thus, one cannot simply intervene in the communications between the remote reader and the central database to forge an invalid authentication result. Referring to FIG. 11, a geometric filter (such as a triangle) on the raw image data can also be used, such that only the microparticles falling within the geometric shape are included in the analysis.

Once the expression code has been obtained from a mark on an article at the time the article is marked or sometime thereafter, the microparticle unique expression code and/or signature strings can be stored in a database for later retrieval to identify and/or authenticate microparticle marks. At this time, a serial number or other serialization can be attached to the mark and therefore the article.

Many options exist for the generation of signature strings, those disclosed above and others that can be conceived based upon random mark characteristics. These signature strings may be saved for future use (many embodiments of this invention, e.g. varying confidence settings, geometric filter encryption, etc will require this data). Additionally, algorithms may be used to generate a single, unique expression code that is stored. The simplest case would be simply creating a macro string connecting all of the individual signature strings in a specified order (e.g. alphabetical). Additional complexity can be added to an expression-code generating algorithm for improved security. For example, a series of expression codes or signature strings can be encrypted.

Acquiring Expression Codes from Marks in a Field Reading

One desiring to determine the identity and authenticity of a product on the market can first determine if the product includes a microparticle mark. Referring to FIG. 7, the field reading broadly includes (a) capturing information for a microparticle mark on an article in the field, (b) processing the information to obtain the signature strings for the individual microparticles and, optionally, an expression code based on the signature strings from the microparticle mark, (c) searching the stored signature strings and/or expression codes for a match with the field reading, and (d) reporting the results of the identification/authentication.

The microparticle mark can be scanned or otherwise read with a reader apparatus. Such a reader apparatus and method of using is described in the patent application, entitled, "AUTOMATIC MICROPARTICLE MARK READER," attached as Appendix B and incorporated herein by reference in its entirety.

A marked article can be identified and authenticated by generating an expression code for the mark similar to the above procedure. This can entail capturing information from the microparticle mark and using an algorithm to generate a microparticle expression code for the microparticle mark on the article based on the signature strings.

After the signature strings have been captured and processed, and the expression code for the applied mark has been determined, one can then use the expression code and/or the signature string to identify and authenticate the article using the process described below.

Comparing Expression from Marks in a Field Reading with Original Marks

After the unique signature strings have been captured and processed to generate expression codes for the original, authentic mark, and the expression codes for the applied marks have been stored in a database, the system is ready for comparing the expression code associated with the field mark to expression codes in a database that are obtained from authentic marked products.

Comparison can be with data stored on the field reader device or accessed from a remote location. When accessing data from a remote location, the transmission can be encrypted for security. Additionally, the remote location may specify the algorithm for processing the data to generate signature strings or the unique expression code, to ensure the presence of the actual mark, rather than a "hacked" transmission or "hijacked" valid previous read/transmission.

Figure 12:
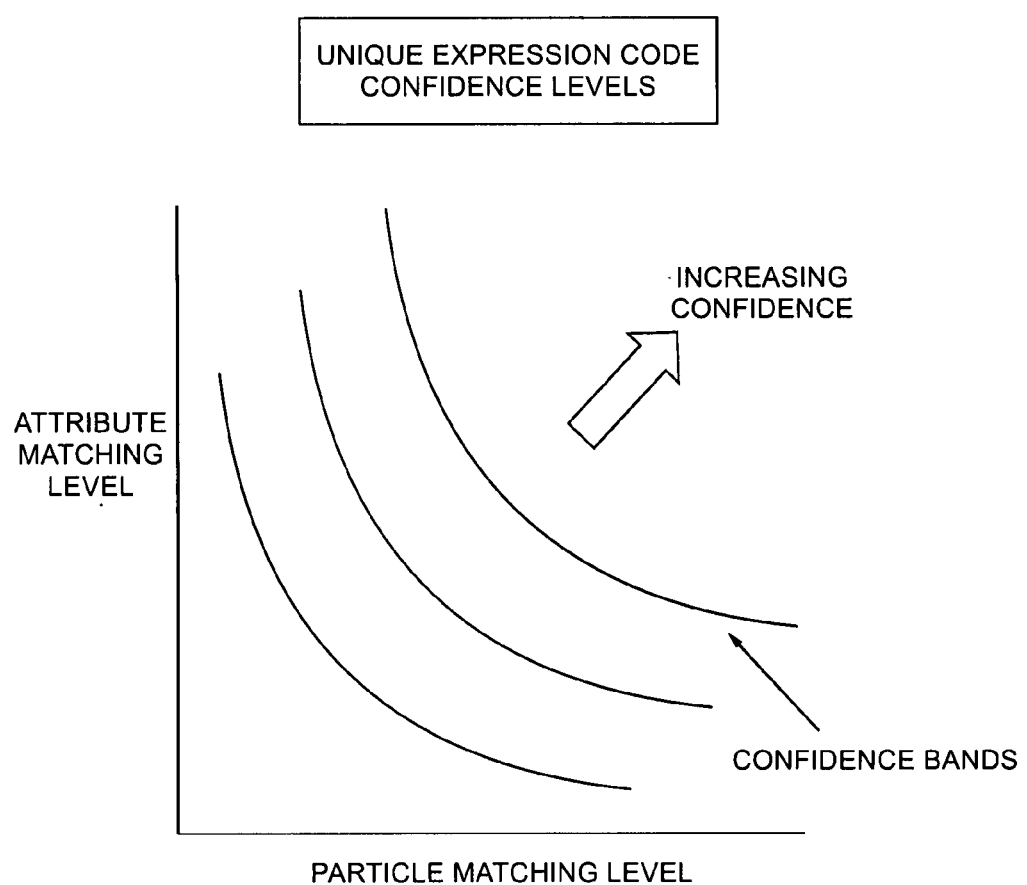
FIG. 12 is a graph depicting confidence bands resulting from varying confidence level settings for required matching levels.

Referring to FIG. 12, in order for a mark to be authenticated, it can be required that the mark contain a certain number of matching signature strings, where a certain number of attributes match for each string with a mark in a database. The match can be a match, e.g., between one microparticle in the field mark and one microparticle in a database. For example, a reader can be used to search for a signature string for an individual microparticle in the field mark that possesses a certain number of matching attributes with the signature string of a microparticle in a valid mark. In this embodiment, a single microparticle match can be enough to authenticate a mark.

In other embodiments, it can be required that the signature strings of two, three, or any number of microparticles be matched before a mark is authenticated. In this embodiment, once a signature string of a first microparticle has been matched, the reader can then be used to search for one or more additional matching signature strings of additional microparticles.

Referring again to FIG. 12, the number of required matching signature strings for each microparticle mark can be set to a first confidence level (x axis). In addition, the required number of matching attributes for each signature string can be set to a second confidence level (y axis). The combination of the first and second confidence levels can be used to create confidence bands. If a field mark falls above the confidence band, it can be determined to be authentic. If a field mark falls below the confidence band, it can be determined to be not authentic. These confidence bands can be adjusted according to a number of variables, including: (1) expense of transaction and (2) desired speed of transaction. As described, however, in some embodiments it can be required only that a mark pass a first confidence level, i.e., having one microparticle that meets the set number of attributes.

Using this authentication method, the security level afforded when using multi-layered color-coded microparticle marks can be extended to provide a level of protection in addition to the first-level microparticle codes. The various embodiments of the present invention provide for expression codes based on signature strings for individual microparticles that can be quickly, accurately, and automatically acquired, stored, and accessed to determine the identification and authenticity of an article.

In addition to the first and second confidence levels and the confidence bands, a third confidence level can be added in which the signature characteristics of the mark as a whole or in part must be matched to authenticate an article. This can include mark attributes such as: (1) the location of each independent microparticle within the mark, (2) the relative locations of a microparticle and its related microparticles, (3) angles formed between each microparticle its related microparticles, and (4) the relative size of the microparticle and its related microparticles.

In the case where identification has already been accomplished, the system can proceed directly to the record for the original expression code reading. In the case where identification is required, one can still proceed quickly to finding its match in the database by using indexing and pattern recognition techniques. For example, rather than searching against all stored expression codes, the dataset searched can be limited to only those expression codes/signature strings present for the specific microparticle code on the article. It will be understood that any number of known string searching techniques may be used in accordance with the searching steps of the present invention, including the use of search engine techniques, such as those used to quickly retrieve valid internet references from the entire collection of web-pages on the internet.

It should also be noted that, while in some cases it might be desired to require a match between the entire mark-expression code, matching between the entire mark-expression code is generally not required. Rather, one can also look for a partial match between the expression codes, such that it is sufficient to distinguish the unique article at the confidence level required by the specific application, but enabling matches to still be determined in those cases where a portion of the mark might have been damaged or is dirty.

If the expression code matches an expression code stored in a database, then the product is identified and the source and/or distribution chain of the product can be identified. If the personal product is not where it is supposed to be, it can be determined which store the product was diverted from. On the other hand, if there is not a match in the database for the mark, then the mark was likely created in an attempt to overcome the system and the product and mark are likely counterfeits.

Finally, the results of the identification/authentication are then reported, such as, for example, on a graphical user interface (GUI) on a reader. The results can also be sent wirelessly or via a cable to a predetermined location or computer.

Expression Code—Authentication Only

Figure 13:
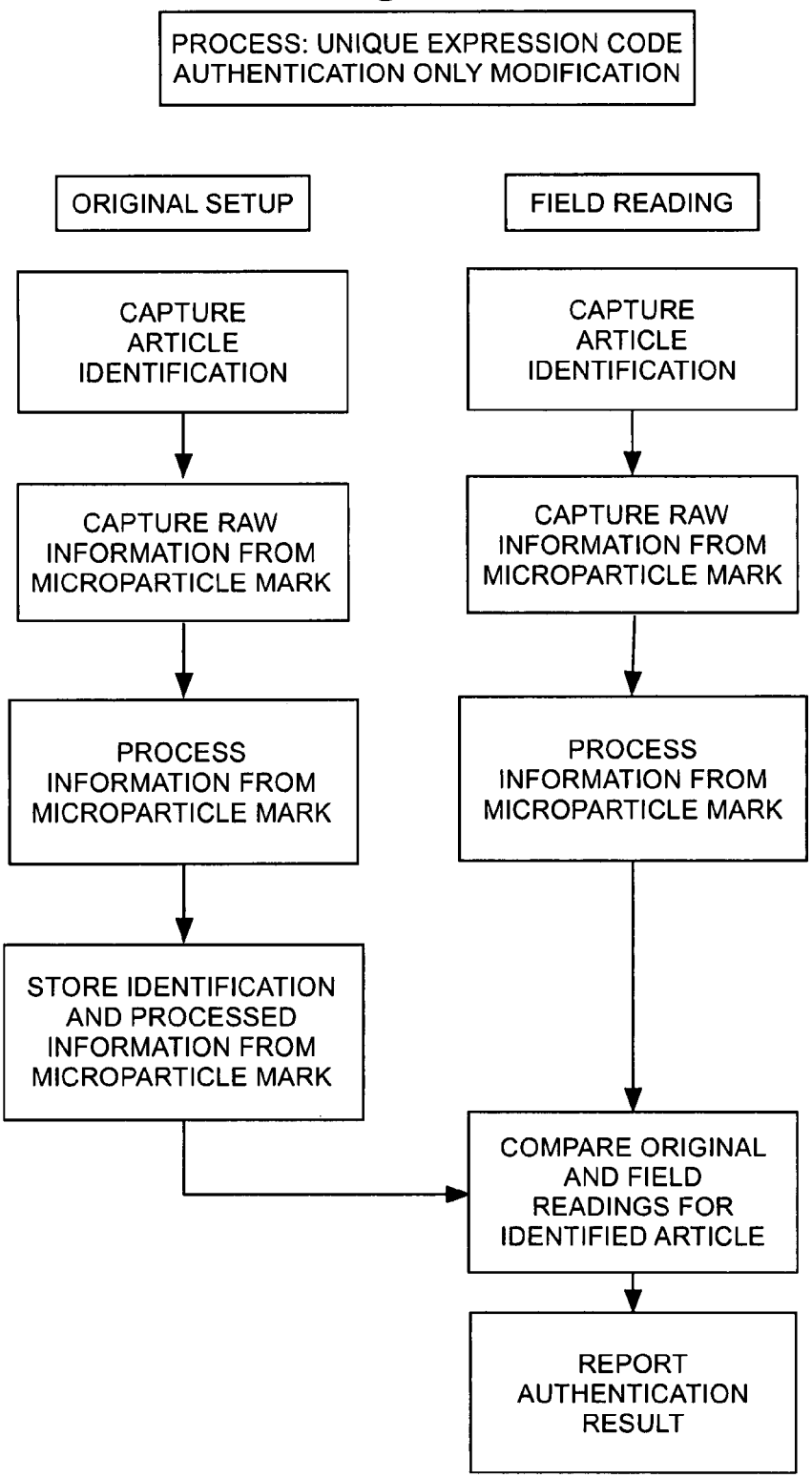
FIG. 13 is a block diagram of the authentication-only method according to an embodiment of the present invention.

Referring to FIG. 13, the expression code can be used for authenticating only (i.e., for an article already identified by another means) an article using a mark on or in the article, its packaging, or its labeling. In this embodiment, after the article has been identified, the raw information has been captured from a microparticle mark in the field and the information has been processed to obtain an expression code, the expression code for the identified article can then be compared to the expression codes stored in the database for the identified article. From the reading and comparison, it can then be determined whether the mark and/or article are authentic.

Relationship Between Microparticle Code, Signature Strings, and Expression Code

Figure 14:
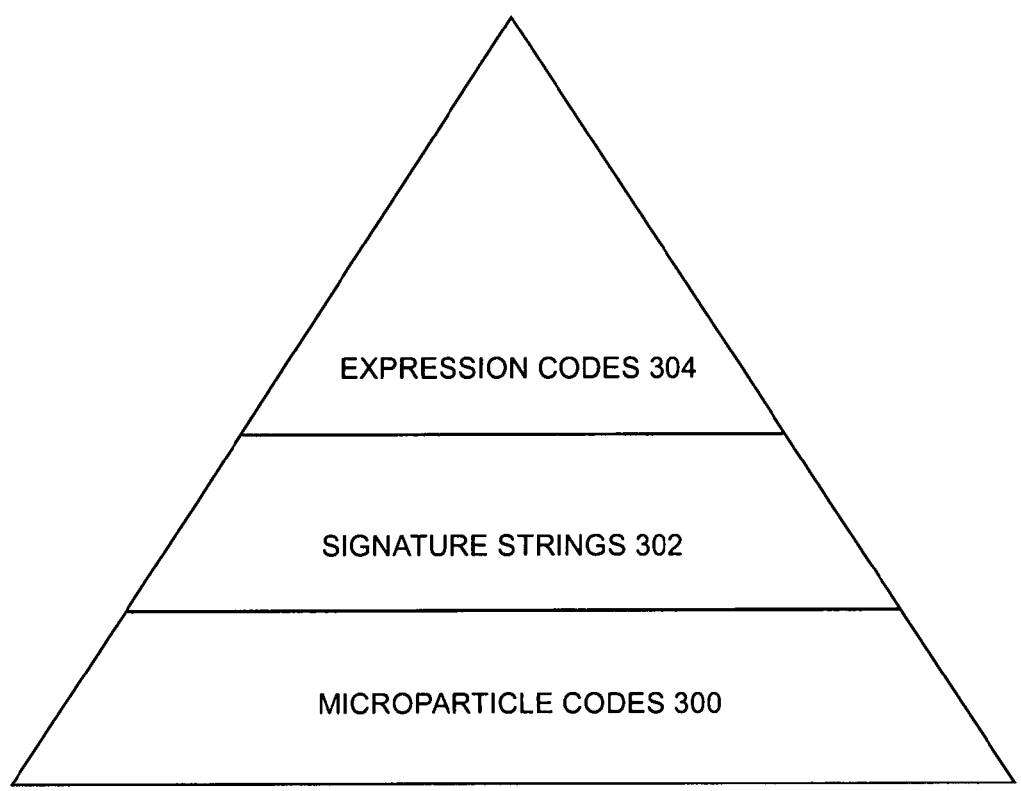
FIGS. 14 and 15 are diagrams showing relationships between expression codes, signature strings, and microparticle codes.
Figure 15:
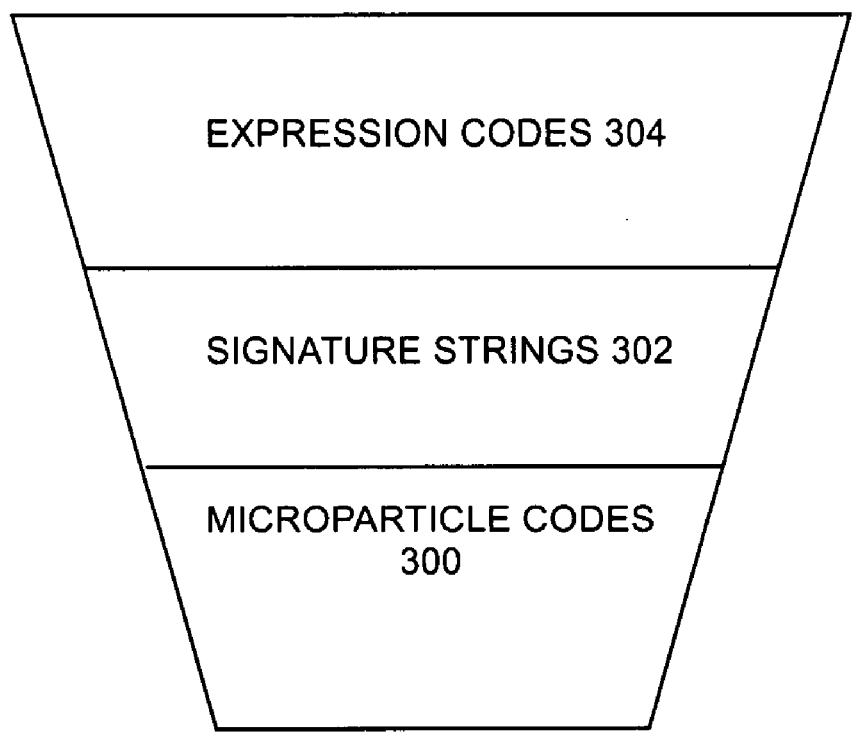

The hierarchical relationship between microparticle codes 300, signature strings 302, and expression codes 304 can be illustrated as shown in FIG. 14. The numeric abundance of unique combinations of microparticle codes, signature strings and expression codes is illustrated in FIG. 15. If the number of microparticle codes 300 is, for example, on the order of n, then the number of signature strings 302 would be exponentially larger $n^x$, while the number of expression codes would be further exponentially larger $n\hat{\ }x^2$.

Overall System Examples

Figure 17:
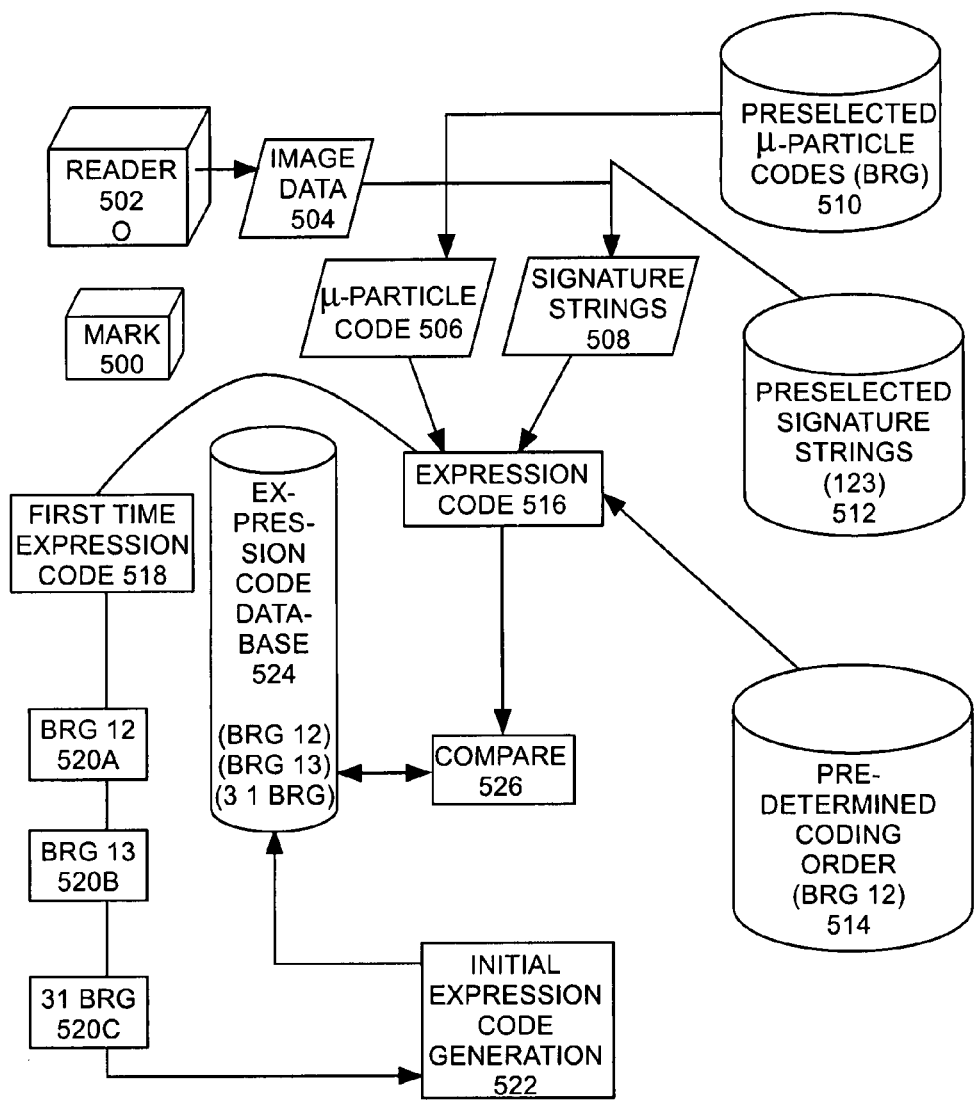
FIGS. 17, 18, and 19 are process diagrams that show how embodiments of the invention can be used to generate and use expression codes and signature strings.

FIG. 17 is a block diagram of a process for authenticating a mark 500. Reader 502 captures an image 504 of mark 500. Image 504 includes microparticle code 506 and signature strings 508. Database 510 stores preselected microparticle codes, for example BRG for the color sequence Blue, Red, and Green that represents a valid microparticle code. Database 512 stores preselected signature strings, for example the signature strings 1, 2, and 3. Database 514 stores a predetermined coding order, for example, first the code for colors BRG, then the signature strings 1 and 2. When microparticle code 506 and signature strings 508 are sorted and/or combined as determined by databases 510, 512, and 514, an expression code results. For example, the expression code could be any of BRG 12, BRG 13, or 31 BRG, in this example.

An initial generation of expression codes may be used to generate a database of expression codes 518 to compare with expression code 516. First-time expression codes 518 may be identified, for example, with codes 520A, B, and C. In this example, these codes may be BRG 12, BRG 13, and 31 BRG, respectively, depending on the possible alternative combinations of predetermined coding order 514 and/or preselected signature strings 512. Codes 520A, B, and C are part of initial expression code generation 522. These codes are then used to populate expression code database 524.

Figure 18:
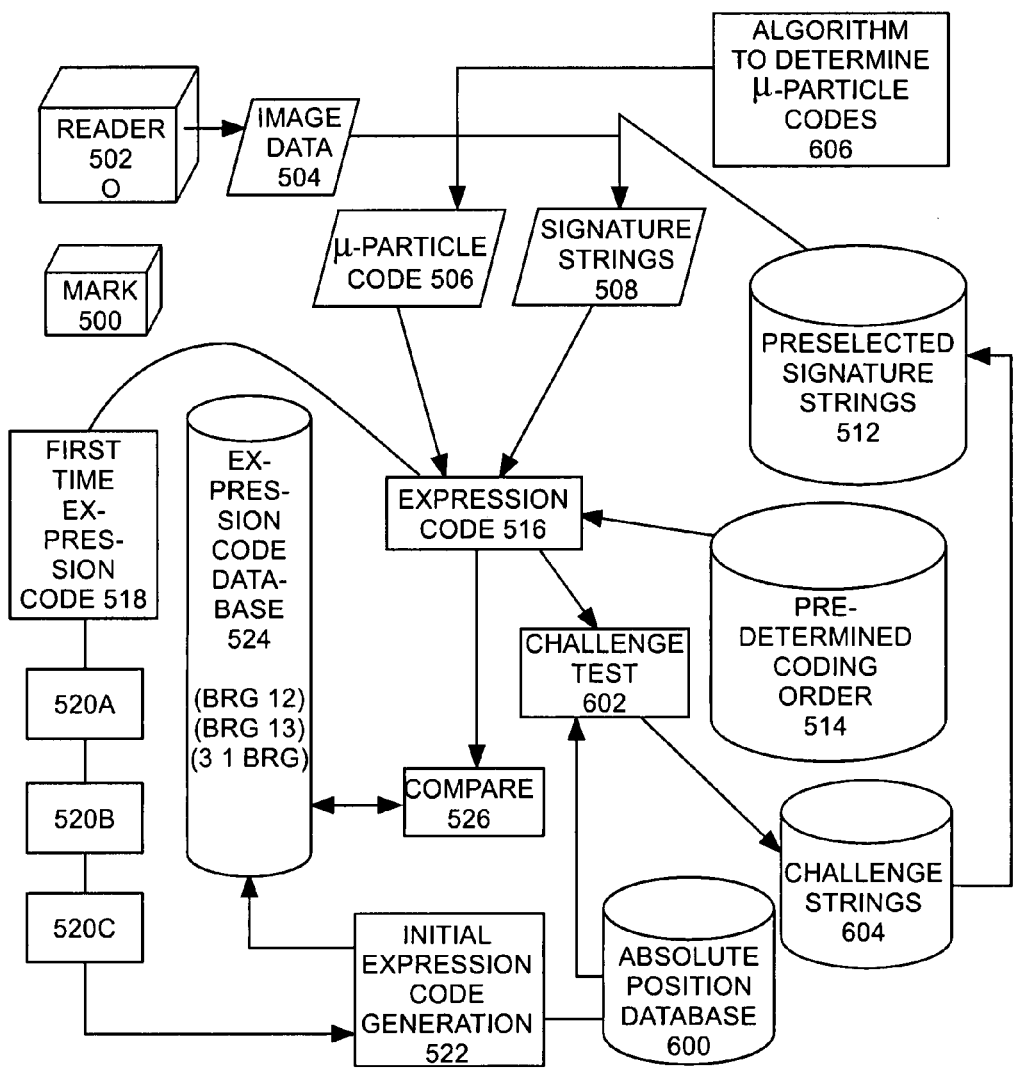

FIG. 18 shows an embodiment of the process in FIG. 17 with a "challenge" process added to test the reliability of the system. An absolute-position database 600 is generated from mark 500. From the absolute-position data, challenge test 602 generates a database of challenge strings 604. Challenge strings 604 are communicated to the preselected signature-database 512 and used to generate signature strings 508 from image data 504. The resulting expression code 516 is then compared to challenge test 602. Because challenge strings 604 are generated from absolute-position data from mark 500, each of expression codes 516 produced by signature strings 508 based on image data 504 should be recognized as authentic by challenge test 602. Further, this embodiment depicts the determination of the microparticle code using an algorithm 606 rather than a database.

Figure 19:
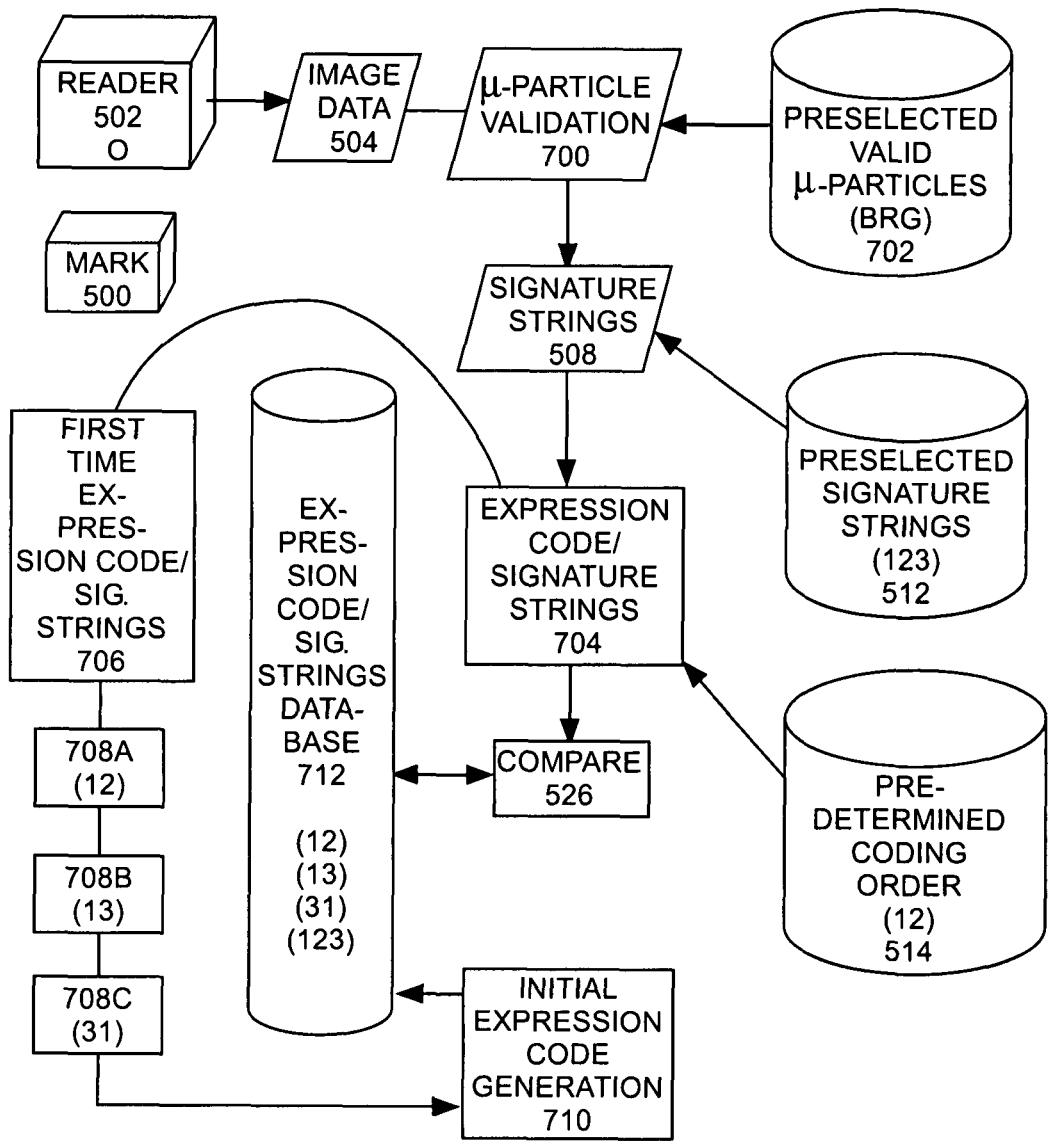

FIG. 19 shows an embodiment of an authentication process that relies only on signature strings to generate expression codes. Image data 504 from mark 500 is captured by reader 502. Microparticles in image data 504 are authenticated as expected microparticles by microparticle validation 700, in part by reference to database 702 of preselected valid microparticles. From the valid microparticles, signature strings 508 are identified. These signature strings 508 then produce an expression code or signature-string code 704, which may include only signature strings, or may include other code elements. The first time the process shown in FIG. 21 is implemented, a first-time expression code or signature-string code 706 may be generated. Exemplary signature-string codes are shown at 708A, B, and C, for example 12, 13, and 31. These expression codes or signature-string codes 706 are used to generate initial expression codes or signature-string codes 710, which then are used to populate database 712, which stores expression codes or signature-string codes. Exemplary signature-string codes may include, for example, 12, 13, 31, or 123.

The embodiments above are intended to be illustrative and not limiting. Additional embodiments are within the claims. In addition, although the present invention has been described with reference to particular embodiments, those skilled in the art will recognize that changes can be made in form and detail without departing from the spirit and scope of the invention. Any incorporation by reference of documents above is limited such that no subject matter is incorporated that is contrary to the explicit disclosure herein.

For purposes of interpreting the claims for the present invention, it is expressly intended that the provisions of Section 112, sixth paragraph of 35 U.S.C. are not to be invoked unless the specific terms "means for" or "step for" are recited in a claim.

The invention claimed is:

1. A method for automatically generating at least one expression code that is unique to a microparticle mark that includes a multiplicity of microparticles and is adapted to be scanned by an automated reader, the method comprising:
   determining whether each of the multiplicity of microparticles in the microparticle mark presents a valid microparticle by examining at least two different indicia expressed by the microparticle and comparing the at least two different indicia to predetermined indicia associated with the microparticle being a valid microparticle, the at least two different indicia representing information other than a location of the microparticle that are adapted to be determined by the automated reader;
   generating at least one signature string representative of at least one feature relationship among only the valid microparticles of the multiplicity of microparticles in the microparticle mark, the at least one feature relationship adapted to be determined by the automated reader;
   using a processing system to generate at least one expression code for the microparticle mark based on the at least one signature string and store the expression code in a storage system, the at least one expression code being unique for the microparticle mark; and
   accessing the storage system to utilize the at least one expression code to verify an authentication of a microparticle mark as scanned by the automated reader such that a tangible indication of the authentication of the microparticle mark is generated.

2. A method for automatically generating at least one expression code that is unique to a microparticle mark that includes a multiplicity of microparticles and is adapted to be scanned by an automated reader, the method comprising:
   generating at least one microparticle code representative of at least one microparticle in the microparticle mark, the microparticle being adapted to express at least two different indicia to the automated reader;
   generating at least one signature string code representative of at least one feature relationship among a multiplicity of microparticles in the microparticle mark, the at least one feature relationship adapted to be determined by the automated reader;
   using a processing system to generate at least one expression code for the microparticle mark based on a subset of codes containing at least one of the at least one microparticle code and at least one of the at least one signature string code and store the expression code in a storage system, the at least one expression code being unique for the microparticle mark; and
   accessing the storage system to utilize the at least one expression code to verify an authentication of a microparticle mark as scanned by the automated reader such that a tangible indication of the authentication of the microparticle mark is generated.

3. A method for automatically generating at least one expression code that is unique to a microparticle mark that includes a multiplicity of multi-layered, multi-color microparticles and is adapted to be scanned by an automated reader, the method comprising:
   determining whether each of the multiplicity of microparticles in the microparticle mark presents a valid microparticle by comparing at least two different colors expressed by the microparticle to a predetermined arrangement of colors associated with the microparticle being a valid microparticle;
   generating at least one signature string representative of a relative location feature among only the valid microparticles of the multiplicity of microparticles in the microparticle mark;
   using a processing system to generate at least one expression code for the microparticle mark based on the at least one signature string and store the expression code in a storage system, the at least one expression code being unique for the microparticle mark; and
   accessing the storage system to utilize the at least one expression code to verify an authentication of a microparticle mark as scanned by the automated reader such that a tangible indication of the authentication of the microparticle mark is generated.

4. A method for automatically generating at least one expression code that is unique to a microparticle mark that includes a multiplicity of microparticles and is adapted to be scanned by an automated reader, the method comprising:
   generating at least two signature strings, each signature string representative of a relative location feature among only the microparticles of the multiplicity of microparticles in the microparticle mark;
   using a processing system to generate at least one expression code for the microparticle mark based on the at least two signature strings and store the expression code in a storage system, the at least one expression code being unique for the microparticle mark; and
   accessing the storage system to utilize the at least one expression code to verify an authentication of a microparticle mark as scanned by the automated reader such that a tangible indication of the authentication of the microparticle mark is generated.

5. A method for automatically generating at least one expression code that is unique to a microparticle mark that includes a multiplicity of microparticles and is adapted to be scanned by an automated reader, the method comprising:
   generating at least one signature string representative of a relative location feature among only the microparticles of the multiplicity of microparticles in the microparticle mark without information for background areas of the microparticle mark other than locations of the microparticles and without using a registration framework;

using a processing system to generate at least one expression code for the microparticle mark based on the at least one signature string and store the expression code in a storage system, the at least one expression code being unique for the microparticle mark; and accessing the storage system to utilize the at least one expression code to verify an authentication of a microparticle mark as scanned by the automated reader such that a tangible indication of the authentication of the microparticle mark is generated.

6. The method of one of claims 1-5 wherein the storage system is directly connected to the automated reader and accessing the storage system is performed local to the automated reader.

7. The method of one of claims 1-5 wherein the storage system is remote from the automated reader and accessing the storage system is performed by communicating over a computer network between the automated reader and the storage system.

8. The method of claim 7 wherein as part of the authentication of the microparticle mark, a challenge is communicated to the automated reader to generate an additional expression code based on an indicated set of signature strings and the additional expression code is verified before the tangible indication of the authentication of the microparticle mark is generated.

9. The method of claim 8 wherein the at least one expression code is stored in a first database and the method further comprises:

using the processing system to generate a three-dimensional representation of features of each of the multiplicity of microparticles in the microparticle mark and store the three-dimensional representation in a second database in the storage system; and generating the challenge based on a feature set generated using the three-dimensional representation.

10. The method of one of claims 1-5 wherein the processing system generates the at least one expression code based on at least two different signature strings.

11. The method of claim 10 wherein verification of the expression code is performed at a reduced confidence level based on a match of less than all of the at least two different signature strings.

12. The method of claim 10 wherein the processing system generates the at least one expression code based on a predetermined order of the at least two different signature strings.

13. The method of one of claims 1-5 wherein the processing system generates at least two different expression codes based on at least two different combinations of signature strings, each expression code being a valid expression code for the same microparticle mark.

14. The method of one of claims 1-5 wherein generating the at least one signature string includes generating a plurality of features as part of a single signature string.

15. The method of claim 14 wherein verification of the expression code is performed at a reduced confidence level based on a match of less than all of the plurality of features of at least one of the signature strings.

16. The method of one of claims 1-5 wherein the processing system generates the at least one expression code and then encrypts the expression code.

17. The method of one of claims 1-5 wherein the microparticles are multi-layer, multi-color microparticles and wherein a validity of the microparticles is verified by:

scanning the microparticle mark to create a scanned image;

identifying at least one region of interest in the scanned image; and for each region of interest, determining a color profile, recognizing a layer order of the color profile and determining if the layer order and color profile represent valid layer orders and color profiles.

18. The method of one of claims 1-5 wherein the microparticles are microparticles presenting at least two different indicia to the automated reader and the at least two different indicia of the microparticle are selected from the set including: at least two different colors expressed by the microparticle mark, at least two different patterns, at least two different symbols, at least two different shapes, or any combination thereof.

19. The method of one of claims 1-5 wherein the relationship among the multiplicity of microparticles used in generating the at least one signature string is selected from the set including: a size of the microparticle, a length of microparticle perimeter, an aspect ratio of the microparticle, a major axis of the microparticle, a minor axis of the microparticle, an average color of the microparticle, a shape of the microparticle, a texture of the microparticle (e.g., smooth, rough, gloss), a pattern of the microparticle (e.g., striped, circular, layered, solid, spotted, woven), an indicia on the microparticle (e.g., text and graphics), an orientation of the microparticle, locations of individual microparticle layers, a size of microparticle layers, an aspect ratio microparticle layer, an orientation of microparticle groupings or any combination thereof.

20. A method for automatically verifying at least one expression code that is unique to a microparticle mark that includes a multiplicity of microparticles, the method comprising:

using an automated reader to scan the microparticle mark to:

determine whether each of the multiplicity of microparticles in the microparticle mark presents a valid microparticle by examining at least two different indicia representing information other than a location of the microparticle that are expressed by the microparticle and comparing the at least two different indicia to at least two predetermined indicia stored in the automated reader that represent a valid microparticle;

generate at least one signature string representative of at least one feature relationship among only the valid microparticles of the multiplicity of microparticles in the microparticle mark, the at least one signature string being generated based on at least one predetermined feature relationship stored in the automated reader that represent a valid signature string;

generate at least one expression code for the microparticle mark based on the at least one signature string;

compare the expression code to a predetermined database of valid expression codes stored in a storage system; and if a match is determined between the at least one expression code and the predetermined database, provide a tangible indication of the authentication of the microparticle mark as scanned by the automated reader.

21. A method for automatically verifying at least one expression code that is unique to a microparticle mark that includes a multiplicity of microparticles, the method comprising:

using an automated reader to scan the microparticle mark to:

generate at least one microparticle code representative of at least one microparticle in the microparticle mark representative of at least two different indicia expressed by the microparticle and compare the at least one microparticle code to a set of valid microparticle codes stored in the automated reader;
generate at least one signature string code representative of at least one feature relationship among a multiplicity of microparticles in the microparticle mark, the at least one signature string being generated based on at least one predetermined feature relationship stored in the automated reader that represent a valid signature string;
generate at least one expression code for the microparticle mark based on a subset of codes containing at least one of the at least one microparticle code and at least one of the at least one signature string code, the at least one expression code being unique for the microparticle mark;
compare the expression code to a predetermined database of valid expression codes stored in a storage system; and
if a match is determined between the at least one expression code and the predetermined database, provide a tangible indication of the authentication of the microparticle mark as scanned by the automated reader.

22. A method for automatically verifying at least one expression code that is unique to a microparticle mark that includes a multiplicity of microparticles, the method comprising:
using an automated reader to scan the microparticle mark to:
determine whether each of the multiplicity of microparticles in the microparticle mark presents a valid microparticle by comparing at least two different colors expressed by the microparticle to a predetermined arrangement of colors associated with the microparticle being a valid microparticle;
generate at least one signature string representative of a relative location feature among only the valid microparticles of the multiplicity of microparticles in the microparticle mark;
generate at least one expression code for the microparticle mark based on the at least one signature string, the at least one expression code being unique for the microparticle mark;
compare the expression code to a predetermined database of valid expression codes stored in a storage system; and
if a match is determined between the at least one expression code and the predetermined database, provide a tangible indication of the authentication of the microparticle mark as scanned by the automated reader.

23. A method for automatically verifying at least one expression code that is unique to a microparticle mark that includes a multiplicity of microparticles, the method comprising:
using an automated reader to scan the microparticle mark to:
generate generating at least two signature strings, each signature string representative of a relative location feature among only the microparticles of the multiplicity of microparticles in the microparticle mark;
generate at least one expression code for the microparticle mark based on the at least two signature strings, the at least one expression code being unique for the microparticle mark; and
compare the expression code to a predetermined database of valid expression codes stored in a storage system; and
if a match is determined between the at least one expression code and the predetermined database, provide a tangible indication of the authentication of the microparticle mark as scanned by the automated reader.

24. A method for automatically verifying at least one expression code that is unique to a microparticle mark that includes a multiplicity of microparticles, the method comprising:
using an automated reader to scan the microparticle mark to:
generate at least one signature string representative of a relative location feature among only the microparticles of the multiplicity of microparticles in the microparticle mark without information for background areas of the microparticle mark other than locations of the microparticles and without using a registration framework;
generate at least one expression code for the microparticle mark based on the at least one signature string, the at least one expression code being unique for the microparticle mark; and
compare the expression code to a predetermined database of valid expression codes stored in a storage system; and
if a match is determined between the at least one expression code and the predetermined database, provide a tangible indication of the authentication of the microparticle mark as scanned by the automated reader.

25. The method of one of claims 20-24 wherein the predetermined database is remote from the automated reader and the expression code is communicated over a computer network to a processing system associated with the predetermined database and the processing systems determines if the match exists between the expression code and the predetermined database.

26. The method of one of claims 20-24 wherein the predetermined database is directly connected to the automated reader and the automated reader determines if the match exists between the expression code and the predetermined database.

27. The method of claim 26 wherein as part of the authentication of the microparticle mark, a challenge is communicated to the automated reader to generate an additional expression code based on an indicated set of signature strings and the additional expression code is verified before the tangible indication of the authentication of the microparticle mark is generated.

28. The method of claim 27 wherein the at least one expression code is stored in a first database and the method further comprises:
using the processing system to generate a three-dimensional representation of features of each of the multiplicity of microparticles in the microparticle mark and store the three-dimensional representation in a second database in the storage system; and
generating the challenge based on a feature set generated using the three-dimensional representation.

29. The method of one of claims 20-24 wherein the match is based on a confidence level that matches less than all of the expression code.

30. The method of one of claims 20-24 wherein the processing system generates the at least one expression code based on at least two different signature strings.

31. The method of claim 30 wherein verification of the expression code is performed at a reduced confidence level based on a match of less than all of the at least two different signature strings.

32. The method of claim 30 wherein the automated reader generates the at least one expression code based on a predetermined order of the at least two different signature strings.

33. The method of one of claims 20-24 wherein the automated reader generates at least two different expression codes based on at least two different combinations of signature strings, each expression code being a valid expression code for the same microparticle mark.

34. The method of one of claims 20-24 wherein generating the at least one signature string includes generating a plurality of features as part of a single signature string.

35. The method of claim 34 wherein verification of the expression code is performed at a reduced confidence level based on a match of less than all of the plurality of features of at least one of the signature strings.

36. The method of one of claims 20-24 wherein the automated reader generates the at least one expression code and then encrypts the expression code.

37. The method of one of claims 20-24 wherein the microparticles are multi-layer, multi-color microparticles and wherein a validity of the microparticles is verified by:
   scanning the microparticle mark to create a scanned image;
   identifying at least one region of interest in the scanned image; and
   for each region of interest, determining a color profile, recognizing a layer order of the color profile and determining if the layer order and color profile represent valid layer orders and color profiles.

38. The method of one of claims 20-24 wherein the microparticles are microparticles presenting at least two different indicia to the automated reader and the at least two different indicia of the microparticle are selected from the set including: at least two different colors expressed by the microparticle mark, at least two different patterns, at least two different symbols, at least two different shapes, or any combination thereof.

39. The method of one of claims 20-24 wherein the relationship among the multiplicity of microparticles used in generating the at least one signature string is selected from the set including: a size of the microparticle, a length of microparticle perimeter, an aspect ration of the microparticle, a major axis of the microparticle, a minor axis of the microparticle, an average color of the microparticle, a shape of the microparticle, a texture of the microparticle (e.g., smooth, rough, gloss), a pattern of the microparticle (e.g., striped, circular, layered, solid, spotted, woven), an indicia on the microparticle (e.g., text and graphics), and an orientation of the microparticle, locations of individual microparticle layers, a size of microparticle layers, an aspect ratio microparticle layer, an orientation of microparticle groupings or any combination thereof.

40. An automatic reader apparatus having an illumination system, a detector system and a processing system adapted to automatically perform the method of one of claims 1-5 and 20-24.

41. An article having a microparticle mark, an existence and authenticity of the microparticle mark being confirmed by the method of one of claims 1-5 and 20-24.

* * * * *